(12) United States Patent
Schueuer et al.

(10) Patent No.: US 10,462,491 B2
(45) Date of Patent: Oct. 29, 2019

(54) LAYERED REPRESENTATION AND DELIVERY OF HIGH DYNAMIC RANGE VIDEO

(71) Applicants: DOLBY LABORATORIES LICENSING CORPORATION, San Francisco, CA (US); DOLBY INTERNATIONAL AB, Amsterdam Zuidoost (NL)

(72) Inventors: Klaas Heinrich Schueuer, Berlin (DE); David Brooks, Mountain View, CA (US); Satoshi Teshigawara, Cupertino, CA (US); Tao Chen, Palo Alto, CA (US)

(73) Assignees: Dolby Laboratories Licensing Corporation, San Francisco, CA (US); Dolby International AB, Amsterdam Zuidoost (NL)

(*) Notice: Subject to any disclaimer, the term of this patent is extended or adjusted under 35 U.S.C. 154(b) by 0 days.

(21) Appl. No.: 15/764,308

(22) PCT Filed: Nov. 1, 2016

(86) PCT No.: PCT/US2016/059862
§ 371 (c)(1),
(2) Date: Mar. 28, 2018

(87) PCT Pub. No.: WO2017/079132
PCT Pub. Date: May 11, 2017

(65) Prior Publication Data
US 2018/0278963 A1 Sep. 27, 2018

Related U.S. Application Data

(60) Provisional application No. 62/249,474, filed on Nov. 2, 2015.

(51) Int. Cl.
*H04N 19/65* (2014.01)
*H04N 19/30* (2014.01)
(Continued)

(52) U.S. Cl.
CPC ............ *H04N 19/65* (2014.11); *H04N 19/30* (2014.11); *H04N 19/463* (2014.11); *H04N 7/0152* (2013.01)

(58) Field of Classification Search
CPC ............................ H04N 19/30; H04N 19/463
See application file for complete search history.

(56) References Cited

U.S. PATENT DOCUMENTS 6,993,705 B1 * 1/2006 MacLellan ......... G11B 20/1833
714/800
8,593,480 B1    11/2013 Ballestad
(Continued)

FOREIGN PATENT DOCUMENTS

EP    2866450       4/2015
JP    11-74868 A    3/1999
(Continued)

OTHER PUBLICATIONS

ITU-commendation BT.709, Parameter Values for the HDTV Standards for Production and International Program Exchange, available from http://www.itu.int.

(Continued)

*Primary Examiner* — Jonathan R Messmore

(57) ABSTRACT

In a method to reconstruct a high dynamic range video signal, a decoder receives a base layer standard dynamic range video signal, an enhancement layer video signal, a metadata bitstream for a reference processing unit and a CRC code related to the metadata. A decoder reconstructs a high-dynamic range video output signal based on the base layer video signal, the enhancement layer video signal, and the data syntax and metadata specified by the metadata bitstream.

18 Claims, 6 Drawing Sheets

(51) Int. Cl.
*H04N 19/463* (2014.01)
*H04N 7/015* (2006.01)

(56) References Cited

U.S. PATENT DOCUMENTS

2014/0341305 A1* 11/2014 Qu .................. H04N 19/70
  375/240.26
2015/0117551 A1 4/2015 Su

FOREIGN PATENT DOCUMENTS

| JP | 2001-025010 A | 1/2001 |
| JP | 2015-503873 A | 2/2015 |
| WO | 2014/176019 | 10/2014 |

OTHER PUBLICATIONS

ITU-R Recommendation BT.2020, Parameter Values for Ultra-High-Definition Television Systems for Production and International Program Exchange, available from http://www.itu.int.
ITU-T H.265 (Oct. 2014), High-Efficiency Video Coding, available at http://www.itu.int.
High-Definition Multimedia Interface™ Specification, version 1.4b, available from http://www.hdmi.org.
High-Definition Multimedia Interface™ Specification, version 2.0, available from http://www.hdmi.org.
SMPTE ST 2084:2014, High Dynamic Range Electro-Optical Transfer Function of Mastering Reference Displays, Aug. 16, 2014.
SMPTE ST 2086:2014, Mastering Display Color Volume Metadata Supporting High Luminance and Wide Color Gamut Images, Oct. 13, 2014.
CEA-861-F, A DTV Profile for Uncompressed High Speed Digital Interfaces.
Audio Visual Application Format Specifications for BD-ROM Version 3.0, White paper Blu-Ray Disc Read-only Format (Ultra HD Blu-ray), Blu-Ray Disc Association, Jul. 2015.
ISO/IEC 13818-1:2013, Information Technology—Generic Coding of Moving Pictures and Associated Audio Information: Systems, available from www.iso.org.
ITU-R BT.1886 "Reference Electro-Optical Transfer Function for Flat Panel Displays Used in HDTV Studio Production" Mar. 2011, pp. 1-7.

* cited by examiner

LAYERED REPRESENTATION AND DELIVERY OF HIGH DYNAMIC RANGE VIDEO

CROSS-REFERENCE TO RELATED APPLICATIONS

This application claims the benefit of U.S. Provisional Application No. 62/249,474, filed Nov. 2, 2015, which is incorporated by reference in its entirety.

TECHNOLOGY

The present invention relates generally to images. More particularly, an embodiment of the present invention relates to the layered representation and delivery of high dynamic range video.

BACKGROUND

The development and adoption of international audio and video coding standards, such as MPEG-2, MPEG-4, H.264, and more recently H.265 (also known as HEVC), has been instrumental for the rapid development, adoption, and proliferation of standard-based devices and communication standards, such as DVD players, Bly-Ray players, and the ATSC and DVB standards for digital television broadcasting.

Display technologies being developed by Dolby Laboratories, Inc., and others are able to reproduce images having high dynamic range (HDR) and wide color gamut. Such displays can reproduce images that more faithfully represent real-word scenes than conventional displays of standard dynamic range (SDR).

As used herein, the term 'dynamic range' (DR) may relate to a capability of the human visual system (HVS) to perceive a range of intensity (e.g., luminance, luma) in an image, e.g., from darkest darks (blacks) to brightest whites (i.e., highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (03/2011), which is included herein by reference in its entity, defines the reference EOTF for flat panel displays based on measured characteristics of the Cathode Ray Tube (CRT). Given a video stream, information about its EOTF is typically embedded in the bit stream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 cd/m$^2$ or nits. Most consumer HDTVs range from 300 to 500 nits with new models reaching 1000 nits (cd/m$^2$). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084:2014 "High Dynamic Range EOTF of Mastering Reference Displays," which is incorporated herein by reference in its entirety. In general, without limitation, the methods of the present disclosure relate to any dynamic range higher than SDR. As appreciated by the inventors here, improved techniques for the coding, delivery, and decoding of high-dynamic range images are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Layered representation and delivery of high dynamic range video (HDR) is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to the layered representation and delivery of high-dynamic range images. In a method for generating high-dynamic range video data with a decoder, the decoder:

receives reference processing data;

parses a cyclic redundancy check (CRC) parameter from the reference processing data;

extracts from the reference processing data at least an RPU data header, RPU data payload data, and an RPU-alignment-zero-bit flag;

computes a CRC value on the entire reference processing data excluding the CRC parameter;

compares the CRC value with the CRC parameter to detect an error;

receives a base-layer image;

receives an enhancement layer image; and combines the base-layer image and the enhancement layer image based on the reference processing data to generate the output image.

Terms and Abbreviations

| Abbreviation | Description |
| --- | --- |
| API | Application programming interface |
| BL | Base layer |
| EL | Enhancement layer |
| HDMI | High-Definition Multimedia Interface |
| LSB | Least-significant bit |
| LUT | Lookup table |
| MMR | Multivariate multiple regression |
| MSB | Most-significant bit |
| NAL | Network Abstraction Layer |
| NLQ | Nonlinear quantization |
| CRC | Cyclic redundancy check |

Technology Overview

Dolby Vision™ for consumer applications is an end-to-end technology suite that enables the creation and distribution of content mastered with a high dynamic range and wide color gamut. Dolby Vision display management matches the capability of a given television by using a series of algorithms to map the signal to any Dolby Vision consumer television. This creates an optimal and seamless video experience for the viewer. As used herein, the term "Dolby Vision video" denotes EDR or HDR video.

Figure 1:
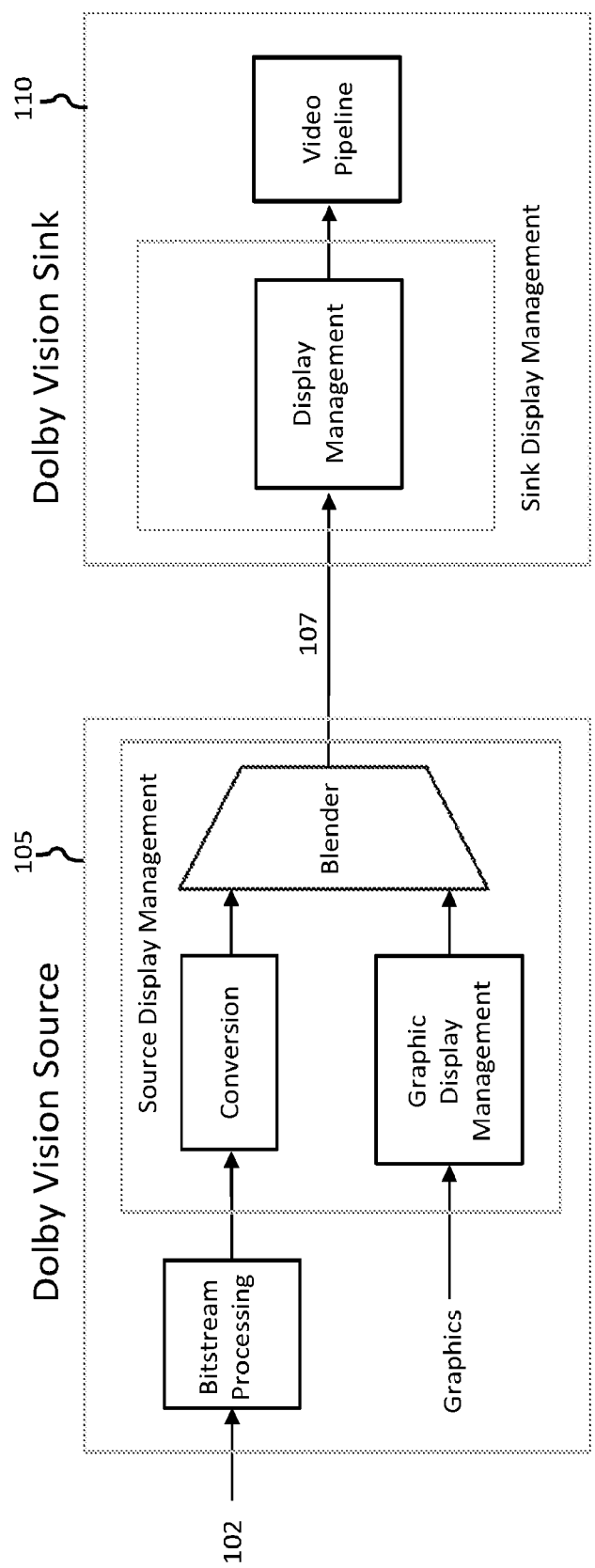
FIG. 1 depicts an example system for the coding, delivery, and display of HDR video according to an embodiment of this invention.

FIG. 1 depicts an example system for the coding, delivery, and display of HDR video according to an embodiment of this invention. As depicted in FIG. 1, in an embodiment of a system for Dolby Vision consumer applications, a Dolby Vision video signal (107) is sent from a Dolby Vision source (105) (e.g., a Dolby Vision capable Ultra-HD Blu-ray player and the like) to a Dolby Vision sink (110) (e.g., a television, a monitor, and the like) via a digital interface (e.g., HDMI).

Figure 2:
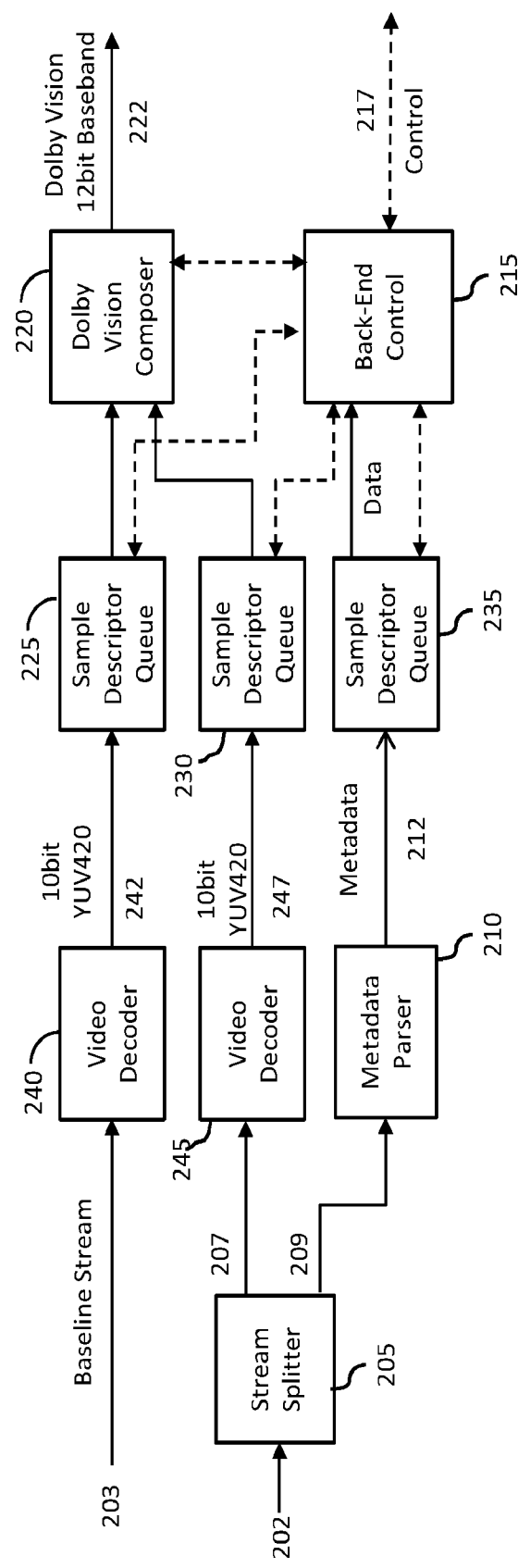
FIG. 2 depicts an example process for dual-layer video decoding of HDR video according to an embodiment of this invention.

FIG. 2 depicts an example processing pipeline for the decoding and playback of Dolby Vision content on an HDR-capable media player according to an embodiment. The video elementary stream (EL) splitter block (205) strips apart the enhancement video data (207) and the metadata information (209) contained in the Dolby Vision EL video stream (202). Given a Dolby Vision input stream (202) (see [9]), the output of (205) consists of an EL video elementary stream (207), and a Dolby Vision metadata bitstream (209).

The metadata parser (210) decodes Dolby Vision metadata from the bitstream. The input metadata bitstream contains:

Dolby Vision specific metadata (i.e. composer (220) prediction coefficients)

Static metadata as defined in SMPTE 2086 in Ref. [7].

Dynamic scene-based metadata (e.g., as may be defined in WD SMPTE ST 2094).

The output (212) contains a composing metadata structure and a display management metadata structure which are described in more detail later on.

The back-end control block (215) is responsible for configuration and control of all composer and display management processing blocks.

The inputs are:

BL video decoder output sample descriptor queue (225)

EL video decoder output sample descriptor queue (230)

Dolby Vision metadata parser output sample descriptor queue (235)

Dolby Vision application control interface parameters

The outputs are:

The values of the composer hardware registers

The values of the display management hardware registers and look-up tables

The controlling signal (217) of the Dolby Vision HDMI hardware block.

The Dolby Vision composer (220) accepts synchronized decoded BL (BDMV HDR) and EL video frames, metadata information, and back-end control block data, and uses the metadata to reconstruct Dolby Vision video frames.

The inputs are:

A BL 10-bit YUV420 signal (242) from a BL video decoder (240) buffer

An EL 10-bit YUV420 signal (247) from an EL video decoder (245) buffer

A metadata structure containing composing coefficients, parameters, and others

The output is a reconstructed Dolby Vision signal YUV420 buffer (222). More detailed information about the Dolby Vision composer is provided later on.

Dolby Vision Enhancement Layer Definitions

A Dolby Vision EL video bitstream (202) consists of one MPEG HEVC video stream with embedded Dolby Vision metadata. The stream is a byte stream of NAL units as defined in Annex B of Ref. [3].

The input of a video elementary stream splitter is a Dolby Vision EL video bitstream (202). The video elementary stream splitter application (205) splits the combined EL video and metadata elementary stream input into two output streams:

The EL video elementary stream (207)
A metadata bitstream (209)

To identify each individual stream in a video elementary stream, the splitter searches the Dolby Vision video elementary byte stream for the 3-byte NAL start code 0x000001 or the 4-byte NAL start code 0x00000001. The first two bytes immediately following the start code identify the layer to which the current NAL unit belongs, as listed in Table 1.

TABLE 1

Dolby Vision Enhancement Layer NAL unit type

| Layer Description | First Two Bytes After Start Code |
|---|---|
| EL video NAL unit | !0x7C01 |
| Dolby Vision metadata NAL unit | 0x7C01 |

Note:
The BL video elementary stream NAL unit bypasses the video elementary stream splitter.

An EL video elementary stream NAL unit can be passed to the EL video decoder without any change.

For the Dolby Vision metadata bitstream NAL unit, the first two bytes (0x7C01) immediately following the start code must be removed before they are sent to the Dolby Vision metadata parser application. A complete definition of the Dolby Vision metadata bitstream syntax and semantics can be found in Annex A.

Dolby Vision metadata, as defined in Annex A and conforming to Ref. [9], are subject to the requirements listed in Table 2.

TABLE 2

Metadata Setup

| Metadata | Setting |
|---|---|
| vdr_rpu_profile | 1 |
| vdr_rpu_level | 0 |
| num_y_partitions_minus1 | 0 |
| num_x_partitions_minus1 | 0 |
| num_pivots_minus2[0] | For polynomial prediction: Must be less or equal to 7<br>For MMR prediction: Must be less or equal to 3<br>For power prediction: Must be equal to 0 |
| num_pivots_minus2[1]<br>num_pivots_minus2[2] | For polynomial prediction: Must be less or equal to 3<br>For MMR or power prediction: Must be equal to 0 |
| nlq_num_pivots_minus2 | 0 |
| prev_vdr_rpu_id | Must be no greater than 0 if this syntax element is present |
| BL_bit_depth_minus8 | 2 |
| EL_bit_depth_minus8 | 2 |
| Vdr_bit_depth_minus8 | An integer no greater than 6 |
| spatial_resampling_filter_flag | 0 |
| mapping_color_space | 0 (YCbCr) |
| mapping_idc[0] | Set to 0 when coefficient_data_type is equal to 0 |
| mapping_idc[1]<br>mapping_idc[2] | Must be 0 or 1 when coefficient_data_type is equal to 0 |
| coefficient_log2_denom | An integer no greater than 23 |
| nlq_method_idc | Set to 0 when coefficient_data_type is equal to 0 |
| BL_chroma_format_idc | 0 |
| EL_chroma_format_idc | 0 |
| mapping_chroma_format_idc | 0 |

Dolby Vision Composer Definition

The Dolby Vision composer (220) accepts decoded BL and EL video frames, metadata information, and back-end control block data, and uses the metadata to reconstruct Dolby Vision video frames.

Composer IO Definitions
Composer Inputs
Decoded Base Layer Video Frame
The decoded BL video input conforms to the following values:

The BL video signal is called $S_{cmp}$, where $0 \leq cmp \leq 2$ represents the three color channels.
The video format is YCbCr 4:2:0.
The video resolution is 3840×2160 or 1920×1080.
The bit depth is equal to 10 bit.
The EOTF is according to SMPTE ST 2084 in Ref. [6].

Decoded Enhancement Layer Video Frame
The decoded EL video input conforms to the following values:

The enhancement-layer video signal is called $R_{cmp}$, where $0 \leq cmp \leq 2$ represents the three color channels.
The video format is YCbCr 4:2:0.
The video resolution is 1920×1080.
The bit depth is equal to 10 bit.

Composer Metadata
The coefficients and parameters used in the metadata for the Dolby Vision composer are as follows.

Coefficient_log_2_denom
This parameter specifies the number of fractional bits for Dolby Vision decoding coefficients if coefficient_data_type=0.

BL_bit_depth
This parameter specifies the bit depth of the BL video signal. It is derived by BL_bit_depth=EL_bit_depth_minus8+8, where BL_bit_depth_minus8 is as defined in Ref. [3]. For Ultra-HD Blu-ray BL_bit_depth must be equal to 10.

EL_bit_depth
This parameter specifies the bit depth of the EL video signal. It is derived by EL_bit_depth=EL_bit_depth_minus8+8, where EL_bit_depth_minus8 is as defined in Ref. [3]. For Ultra-HD Blu-ray EL_bit_depth must be equal to 10.

vdr_bit_depth
This parameter specifies the bit depth of the reconstructed Dolby Vision video signal. It is derived by vdr_bit_depth=vdr_bit_depth_minus8+8, where vdr_bit_depth_minus8 is as defined in Ref. [3].

mapping_idc
This parameter specifies the prediction method for each color channel of the BL. For the luma channel, only 0 is allowed. For the chroma channels, mapping_idc must be in the range of 0 to 1.

spatial_resampling_filter_flag
For Ultra-HD Blu-ray this flag must be equal to 0.

spatial_resampling_explicit_filter_flag
For Ultra-HD Blu-ray this flag must be equal to 0.

Base layer Prediction Coefficients
For the Dolby Vision for Ultra-HD Blu-ray decoder, the prediction method is a piece-wise polynomial mapping up to the second order. The maximum number of channel segments allowed is eight.

The polynomial function coefficients are $\{fpoly\_coef_{c,j,i}\}$, where $0 \leq c \leq 2$ (c is the color channel index), $0 \leq j \leq 7$ (j is the segment index) and $0 \leq i \leq 2$ (i is the coefficient order):

$fpoly\_coef_{c,j,i}$ are the coefficients for each color channel c, each segment j and each order i.

fpoly_coef$_{c,j,i}$=(poly_coef_int[0][0][c][j][i]
  <<coefficient_log2_denom)|poly_coef[0][0][c][j][i]

Each polynomial coefficient is a real number with a bit depth of coefficient_log2_denom+7, as specified in the following list:
  Bit[coefficient_log2_denom+6]: Sign bit
  Bit[coefficient_log2_denom+5: coefficient_log2_denom]: Integer part
  Bit[coefficient_log2_denom−1:0]: Fractional part Alternatively, the chroma channels can be predicted using a multiple multivariate regression function up to third order. The multi-variate multiple regression coefficients are $\{m_{c,i}\}$, where $1 \leq c \leq 2$ (c is the color channel index) and $0 \leq i \leq 21$ (i is the coefficient number):
  $m_{c,0}$ is the multivariate regression constant.
  $m_{c,0}$=(mmr_constant_int[0][0][j][0]
    <<coefficient_log2_denom)|mmr_constant [0][0][j][0]
  $m_{c,i}$ are the multivariate regression coefficients.
  $m_{c,i}$=(mmr_coef_int[0][0][0][0][m][n]
    <<coefficient_log2_denom)|mmr_coef [0][0][j][0][m][n]
  i=7*(m−1)+n with $1 \leq m \leq 3$ and $1 \leq n \leq 7$.

Each polynomial coefficient is a real number with a bit depth of coefficient_log2_denom+17, as specified in the following list:
  Bit[coefficient_log2_denom+16]: Sign bit
  Bit[coefficient_log2_denom+15: coefficient_log2_denom]: Integer part
  Bit[coefficient_log2_denom−1:0]: Fractional part
  Note: pivot_value, poly_coef_int, poly_coef, mmr_constant_int, mmr_constant, mmr_coef_int, and mmr_coef are decoding metadata syntax elements, as defined in Ref. [11].

Enhancement Layer Inverse Quantization Coefficients

For the Dolby Vision for Ultra-HD Blu-ray decoder, the inverse quantization method is linear with dead zone. The maximum number of segments allowed is one.

The linear-with-dead-zone function coefficients of the luma and chroma channels are
  $\{S[j], M[j], T[j], Rmax[j]\}$, where $0 \leq j \leq 2$ (j is the color channel index) and i=0 (i is the segment index):
  S[j] is the slope coefficient of the linear-with-dead-zone function.
  S[j]=((linear_deadzone_slope_int[0][0][i][j]
    <<coefficient_log2_denom)|linear_deadzone_slope[0][0][i][j]).
  M[j] is the offset coefficient of the linear-with-dead-zone function.
  M[j]=nlq_offset [0][0][i][j].
  T[j] is the threshold coefficient of the linear-with-dead-zone function.
  T[j]=((linear_deadzone_threshold_int[0][0][i][j]
    <<coefficient_log2_denom)|linear_deadzone_threshold[0][0][i][j]).
  Rmax[j] is the maximum enhancement layer value coefficient of the linear-with-dead-zone function.
  Rmax[j]=((vdr_in_max_int[0][0][i][j]
    <<coefficient_log2_denom)|vdr_in_max [0][i][j]).
  M[j] is an integer with a value in the range of [0, 2EL_bit_depth−1] and a bit depth of EL_bit_depth.

Other inverse quantization coefficients are real numbers with bit depths of coefficient_log2_denom+2, as specified in the following list:
  Bit[coefficient_log2_denom+1]: Sign bit
  Bit[coefficient_log2_denom]: Integer part
  Bit[coefficient_log2_denom−1:0]: Fractional part Note: linear_deadzone_slope_int, linear_deadzone_slope, nlq_offset, linear_deadzone_threshold_int, linear_deadzone_threshold, vdr_in_max_int, and vdr_in_max are decoding metadata syntax elements, as defined in Ref. [11].

Composer Output
  Composer output conforms to the following values:
  The output is a Dolby Vision signal called $V_{cmp}$, where $0 \leq cmp \leq 2$ represents the three color channels.
  The video format is YCbCr 4:2:0.
  The resolution is 3840×2160 or 1920×1080.
  Bit depth is equal to vdr_bit_depth.

Composer Decoding Process
Base-Layer Decoding Process

Figure 3:
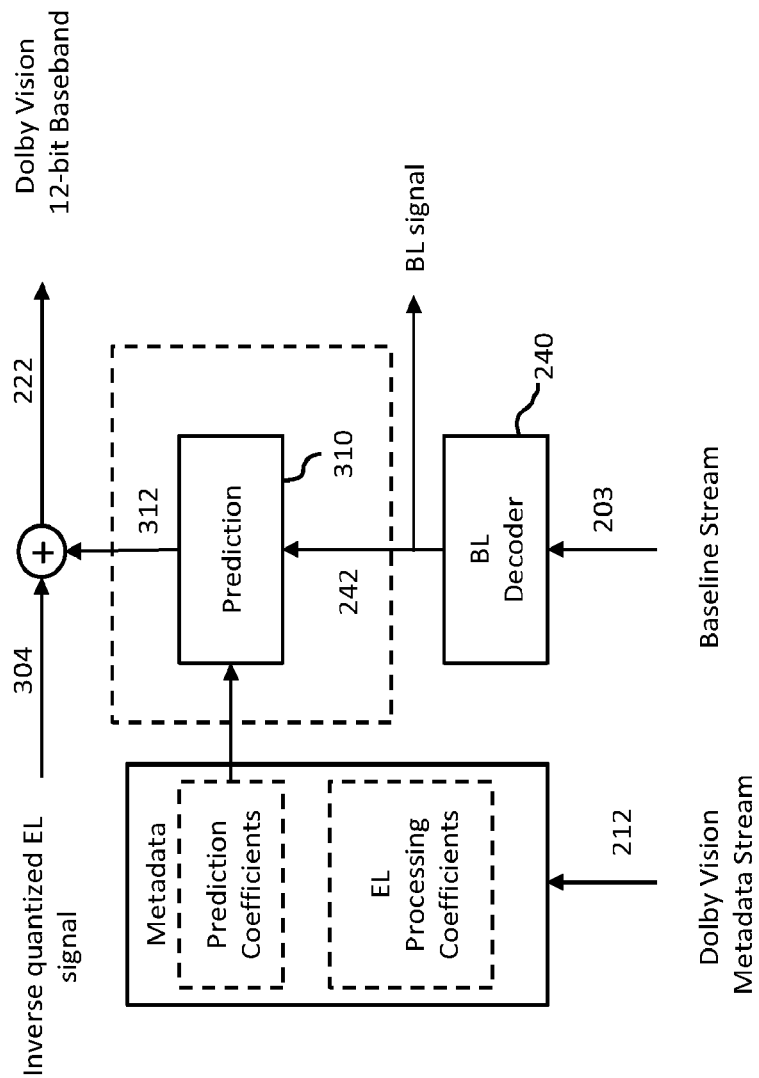
FIG. 3 depicts an example process for base layer processing in HDR video decoding according to an embodiment of this invention.

FIG. 3 depicts an example decoding process of the base layer (BL) according to an embodiment. The decoded BL samples (242) are given by the decoding process (240) of the baseline video stream (203). The decoded BL signal (242) is mapped to the dynamic range of the EL signal domain using pre-selected prediction coefficients signaled in the Dolby Vision metadata (212). Predicted BL signal's decimal values are in the range of [0,1). The predicted BL signal (312) will be added to the inverse quantized EL signal (304) to reconstruct the HDR Dolby Vision signal (222).

Different prediction methods can be applied. For the Dolby Vision for Ultra-HD Blu-ray decoder, the prediction method for the luma channel is a piece-wise polynomial up to the second order. For the chroma channels, the prediction method is a piece-wise polynomial up to the second order or multivariate multiple regression up to the third order.

Base Layer Inverse Mapping

To generate the prediction from BL to EL, the mapping from BL signal range to EL signal range is done with a prediction curve consisting of multiple segments. The pivots (or boundaries) of these segments are derived as follows.

The value of num_pivots_minus2 indicates how many pivot points exist for the component cmp of the current BL video frame. The value of each pivot point is stored in a sorted array pivot_value[cmp][ ], where pivot_value[cmp][0] is a low end-point value and pivot_value[cmp][num_pivots_minus2 [cmp]+1] is a high end-point value.

To find the pivot values for a given sample Scmp, the pivot_value array is traversed until the sample value lies between two pivot values; this determines the segment. The sample is capped at the low- and high-end pivot values.

MAPPING_POLYNOMIAL Method

This method is applied to the luma component or when mapping_idc is equal to zero. The resulting prediction from BL is constructed in a piecewise manner. Inputs are the BL signal of the current component and the pivot array introduced in the previous section. The variables poly_order_minus1 and linear_interp_flag are held in the Dolby Vision metadata.

When linear_interp_flag is 1, linear interpolation is performed between the two pivot values of the current segment j where the BL pixel value S is located. Otherwise, full polynomial prediction for an N-order polynomial is calculated according to $$R = \sum_{i=0}^{N} \text{fpoly\_coef}_{j,i} * (S/2^{BL\_bit\_depth})^i, \quad (1)$$

where fpoly_coef are prediction coefficients signaled in the Dolby Vision metadata. The calculation can be carried out in fixed point or 32-bit floating point.

MAPPING_MMR Method

This mapping applies to chroma only. In a first step, the BL luma component must be downsampled by using the downsampling filters specified in the following equations before performing the multivariate multiple regression prediction process.

Horizontal downsampling filter:

$$r[n]=\text{Clip3}(0,(y[2n-1]+2*y[2n]+y[2n+1]+2)>>2, 1023); \quad (2)$$

Vertical downsampling filter:

$$r[n]=\text{Clip3}(0,(y[2n]+y[2n+1]+1)>>1,1023); \quad (3)$$

Horizontal downsampling is applied first, followed by vertical downsampling. If the pixel used in equations 2 and 3 is out of the picture boundary, it is set to the value of the pixel at the picture boundary. That is, image edges are handled by pixel replication. Values of $S_{cmp}$ are clamped to highest and lowest pivot value respectively. Then, a multiple multivariate regression is performed:

$$R = m_0 + \sum_{i=0}^{N} \begin{pmatrix} m_1[i] \cdot S_0^i + m_2[i] \cdot S_1^i + m_3[i] \cdot S_2^i + m_4[i] \cdot S_0^i \cdot S_1^i + \\ m_5[i] \cdot S_0^i \cdot S_2^i + m_6[i] \cdot S_1^i \cdot S_2^i + m_7[i] \cdot S_0^i \cdot S_1^i \cdot S_2^i \end{pmatrix}, \quad (4)$$

where the coefficients m are transmitted in the Dolby Vision metadata and depend on the current segment and color channel. The order N is specified in the Dolby Vision metadata as well. The calculation can be carried out in fixed point or 32 bit floating point.

Enhancement Layer Decoding Process

For each BL video frame, there is a corresponding EL video frame that is reconstructed by the EL video decoder. The Dolby Vision decoder must guarantee that the decoded BL video frame and the decoded EL video frame are both in display order and frame aligned to each other. In an EL video frame, the sample values carry three quantized components of an EL signal in YCbCr color space. Once an EL video frame is aligned with its corresponding BL video frame, it must:

1. Upscale the EL signal to the same resolution of BL, if the EL resolution is lower than the BL resolution
2. Perform inverse quantization to translate the EL signal to the Dolby Vision signal domain.

Figure 4:
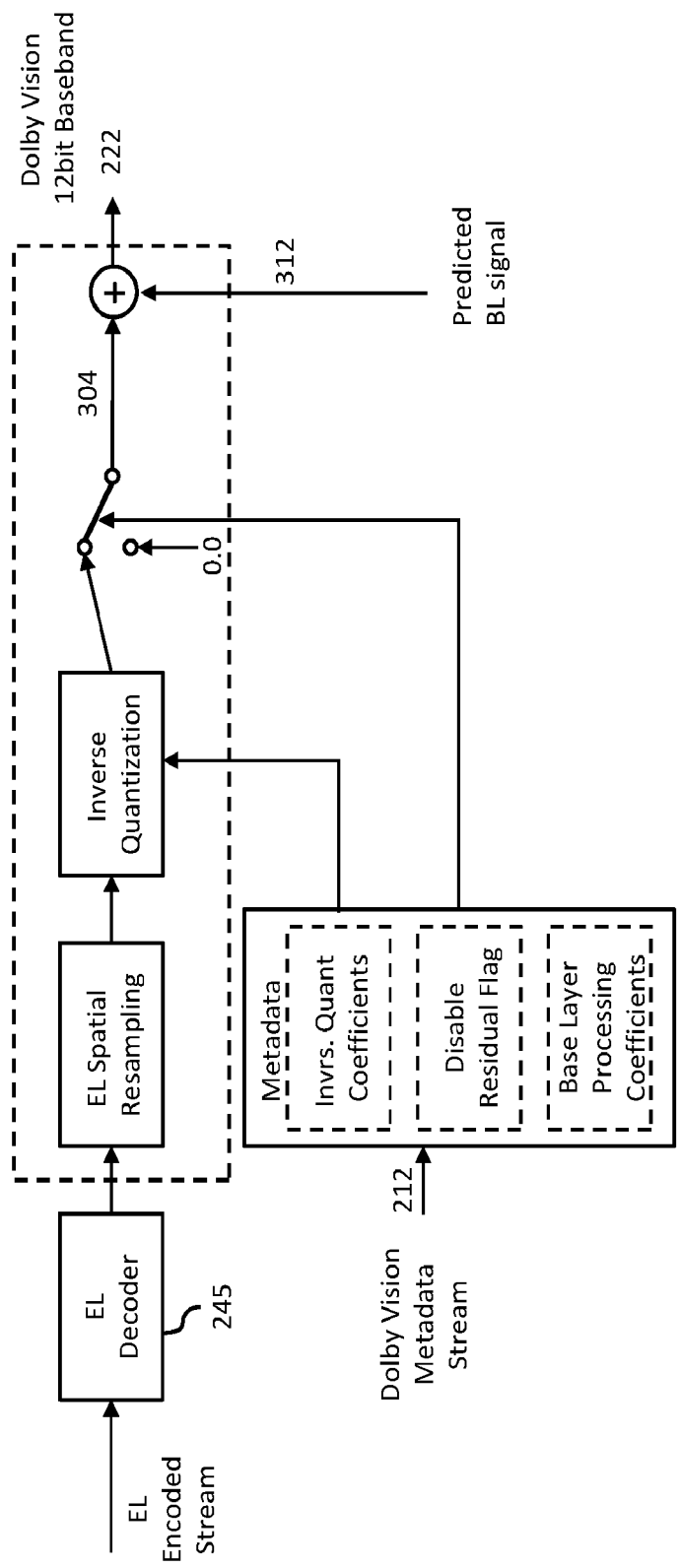
FIG. 4 depicts an example process for enhancement layer processing in HDR video decoding according to an embodiment of this invention.

The inverse quantized EL signal can now be added to the predicted BL signal. An example process for the EL decoding processing is shown in FIG. 4.

Enhancement Layer Spatial Resampling

If the el_spatial_resampling_filter_flag is equal to 1, the Dolby Vision decoder must upsample the reconstructed signal from the EL video decoder in both the horizontal and vertical directions. If the el_spatial_resampling_filter_flag is equal to 0, the EL spatial resampling is bypassed.

The input is the reconstructed video frame from the EL video decoder with bit depth equal to EL_bit_depth and without any changes to the chroma format. The output of this process is a spatially upsampled, reconstructed EL signal with the same bit depth and chroma format as the input signal.

Vertical upsampling is applied first, followed by horizontal upsampling.

Enhancement Layer Nonlinear Dequantization

The input is a reconstructed EL signal with a bit depth equal to 10 (EL_bit_depth=10). Based on the value of coefficient_data_type, the final output is either a fixed-point integer or a 32-bit single precision floating point value. The NLdQ method to be used is determined as follows:

If nlq_method_idc is equal to 0, NLQ_LINEAR_DZ applies.

If nlq_method_idc is equal to 1, NLQ_MU_LAW applies.

NLQ_LINEAR_DZ

The linear with dead zone dequantization employs piecewise linear functions to calculate the dequantized pel values. Each of the linear functions is specified by slope S, threshold T and offset M, with a deadzone defined at the offset. This process is operated individually on each component of each pel R and is given by:

$$dR = \begin{cases} 0, & R = M \\ S^*((R-M)-0.5*\text{sign}(R-M))+T*\text{sign}(R-M) & R \neq M \end{cases}, \quad (5)$$

with $$\text{sign}(x) = \begin{cases} -1 & x < 0 \\ 1 & x \geq 0 \end{cases}$$

The Dequantized Pixel Value is Given by dR.

The Dolby Vision signal reconstruction takes in the predicted (or mapped) BL signal and the inverse quantized EL signal, and the reconstructed pel value is a sum of the two inputs. Based on the value of coefficient_data_type, the final output is either a fixed-point integer or a 32-bit single precision floating point value. Appropriate offsetting, scaling and clipping are specified accordingly for each case to ensure a valid pel value.

Definition of Graphic Overlay Adaptation

Graphics processing for Dolby Vision is similar to the Graphics processing of the BDMV HDR case, but it is handled inside of the Dolby Vision Image Processing. Graphics processing for Dolby Vision adds an additional processing step of inverse display management to the graphics handling. This additional step maps the graphics signal to the Dolby Vision signal space.

Figure 5A:
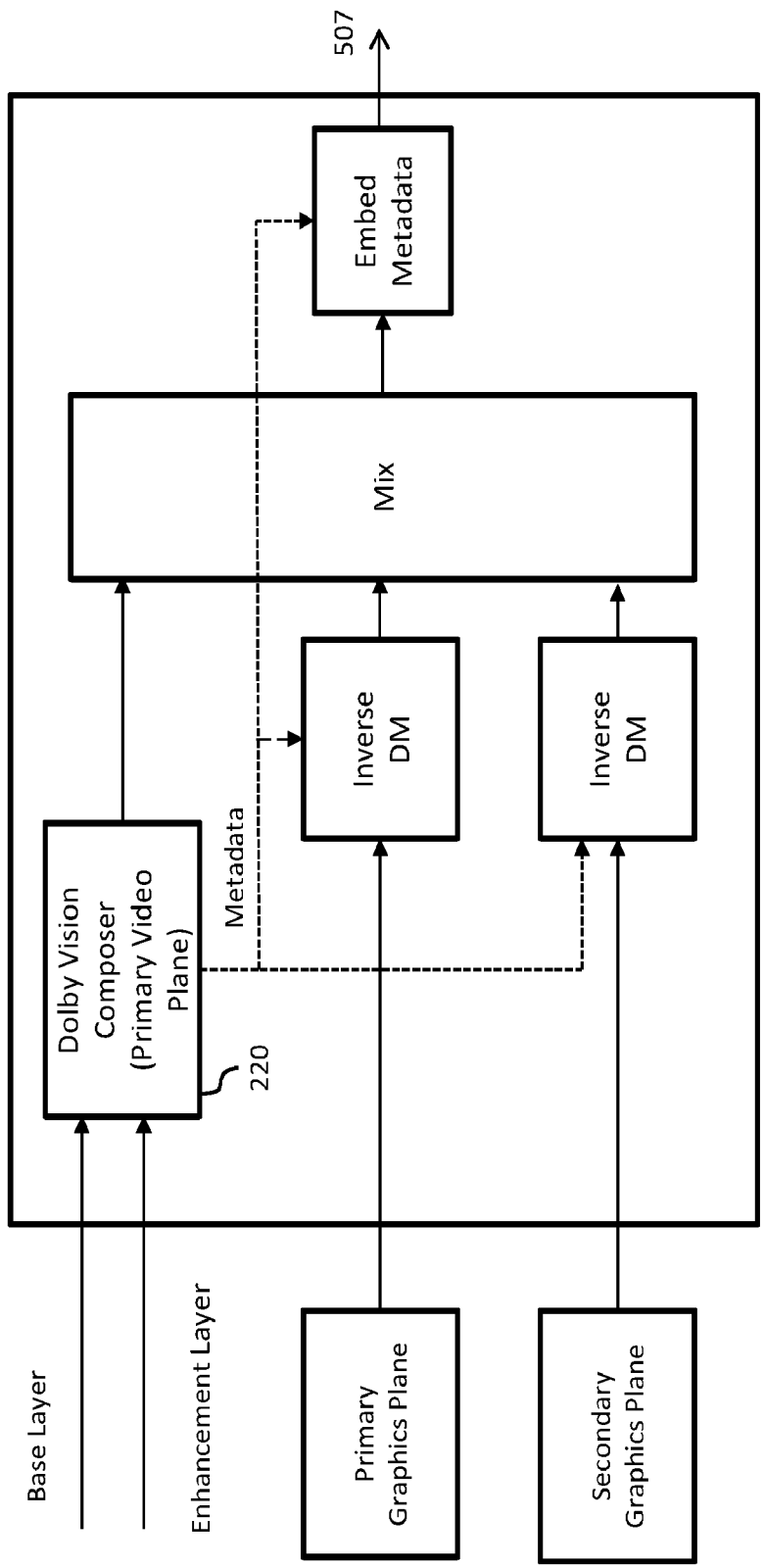
FIG. 5A and FIG. 5B depict example processes for graphics overlay on HDR video according to an embodiment of this invention.

FIG. 5A depicts an example of the video overlay process in a first embodiment (e.g., HDMV mode). It follows the conceptual model of presentation planes as described in Ref. [9]. In addition, inverse display management (inverse DM) is applied to the Primary and Secondary graphics planes (e.g., for presentation and/or interactive graphics) prior to the mixing process so that the dynamic ranges of the input primary and secondary graphics matches the dynamic range of the signal at the output of the Dolby Vision composer. As used herein, the term 'inverse display management' denotes a process to increase the dynamic range of a signal. An example of a dynamic range mapping function may be found in Ref. [12].

Figure 5B:
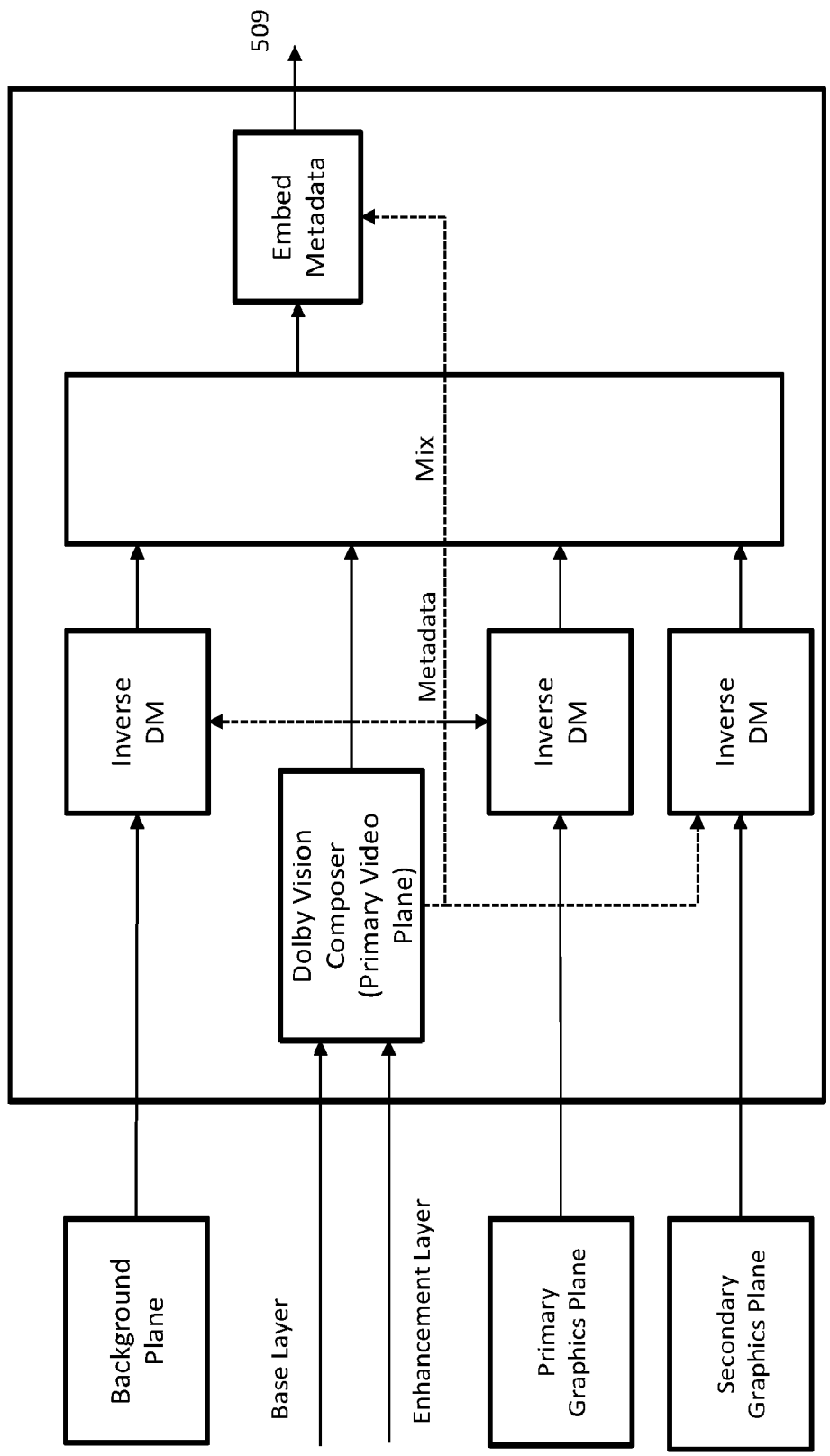

FIG. 5B depicts an example of the video overlay process in a second embodiment (e.g., BD-J mode). In addition to the current presentation plane model of BD-J mode, as described in [9], an inverse display management (Inverse DM) shall be applied to the existing graphic planes as shown in the figure.

Definition of the Dolby Vision HDMI Interface

Dolby Vision content is transmitted to the rendering device via HDMI. The HDMI device must support HD @ 60p, UHD @ 30p and UHD @ 60p. The Dolby Vision pixel format is 12-bit YCbCr 4:2:2.

HDMI Sink

A Dolby Vision display (i.e. the HDMI sink) indicates its support for Dolby Vision content in its HDMI E-EDID by setting a flag in the Dolby Vision Vendor Specific Video Data Block (VSVDB) conforming to CEA Extension version 3 as defined in section 7.5.7 of [8]. Further, it shall also indicate support for YCbCr 4:2:2 in its E-EDID.

The Dolby Vision VSVDB also contains the 12 bit primary RGB chromaticities, white points and luminance characteristics of the display. The Dolby Vision display verifies that it is connected to a Dolby Vision capable source device (i.e. the Ultra HD Blu-ray player) by checking the validity of the metadata CRC (Cyclic Redundancy Check) as defined later.

HDMI Source

The Dolby Vision capable Ultra HD Blu-ray player (i.e. HDMI Source) transmits the Dolby Vision baseband video signal incorporating the embedded metadata stream. The embedded metadata and its CRC protection are used to indicate that a valid Dolby Vision baseband signal is present. HDMI source and sink negotiate the resulting Dolby Vision format—if any—before transmission according to the HDMI protocol.

Dolby Vision Metadata

To accommodate the display properties, Dolby Vision Display Management (DM) metadata is sent to the Dolby Vision capable display on a per-frame basis. Nonetheless, the DM metadata can be shared among multiple frames, leading to a scene based DM metadata package in the best case. Up to 16 DM metadata packages shall be buffered for reference.

A DM metadata structure holds information about its identifier, the previous frame's metadata to be replaced, scene cut information, and about color conversion matrices from YCbCr to display-RGB. The metadata is packetized into one or more DM metadata transmission packets of 1024 bits each. These consist of packet type identifiers, the DM metadata, and a 32 bit-CRC. There are four kinds of EDR metadata transmission packet types:

0b00: a single packet carries an entire Dolby Vision DM metadata structure

0b01: the first packet if multiple packets carry the Dolby Vision DM metadata structure 0b10: intermediate packet(s) if multiple packets carry the Dolby Vision DM metadata structure 0b11: the last packet if multiple packets carry the Dolby Vision DM metadata structure Dolby Vision Metadata Transmission For transmission, the Dolby Vision DM metadata package is put bit by bit into the least significant bit of each 12 bit chroma channel in the YCbCr 4:2:2 signal. When Dolby Vision DM metadata transmission packet is represented in a sequence of bits, the first byte goes first with the most significant bit of that byte first. For example, for a byte 0x01, the seven zeros go first followed by the one 1. The i-th bit of the Dolby Vision DM metadata transmission packet is at bit[m] ($0 \leq m \leq 7$) of byte[n] ($0 \leq n \leq 127$) where $i=(n*8+(7-m))$.

Assuming that the Dolby Vision video frame has a resolution of W×H and a pixel sample can be represented using coordinates (y, x), where $0 \leq y \leq H$ and $0 \leq x \leq W$. For each pixel, there are one luma sample and one chrominance sample, which is the Cb component for an even pixel or the Cr component for an odd pixel. In raster scan order the i-th pixel is at (y, x) and $i=(Wxy+x)$.

The i-th bit of a Dolby Vision DM metadata transmission packet shall be placed onto the least significant bit of chrominance sample of the i-th pixel (y, x) in raster scan order in the Dolby Vision video frame.

To improve the imperceptibility of embedding the Dolby Vision DM metadata into the YCbCr signal, bit scrambling is applied to the metadata before embedding.

For the sake of robustness, each Dolby Vision DM metadata transmission packet shall be sent three times consecutively. The Dolby Vision sink shall check the CRC of the transmission packets and discard subsequent copies as soon as one CRC is valid. If the packet type is not 0b00, i.e. if the Dolby Vision DM metadata is split among multiple transmission packets, all these packets share the same metadata identifier and all shall be included within one single video frame. The first transmission packet shall have packet type 0b01, the last one 0b11, the intermediate ones 0b10 in this case.

An example of the metadata bits embedded into the samples for the first four luminance and associated chrominance samples is shown in Table 3 with 12 bits on the input chain.

TABLE 3

Layout of Dolby Vision DM metadata embedded in 12-bit EDR YCbCr 4:2:2 video data

| | Cb[0] | Y[0] | Cr[0] | Y[1] | Cb[1] | Y[2] | Cr[1] | Y[3] |
|---|---|---|---|---|---|---|---|---|
| D11 | Cb[0][11] | Y[0][11] | Cr[0][11] | Y[1][11] | Cb[1][11] | Y[2][11] | Cr[1][11] | Y[3][11] |
| D10 | Cb[0][10] | Y[0][10] | Cr[0][10] | Y[1][10] | Cb[1][10] | Y[2][10] | Cr[1][10] | Y[3][10] |
| D9 | Cb[0][9] | Y[0][9] | Cr[0][9] | Y[1][9] | Cb[1][9] | Y[2][9] | Cr[1][9] | Y[3][9] |
| D8 | Cb[0][8] | Y[0][8] | Cr[0][8] | Y[1][8] | Cb[1][8] | Y[2][8] | Cr[1][8] | Y[3][8] |
| D7 | Cb[0][7] | Y[0][7] | Cr[0][7] | Y[1][7] | Cb[1][7] | Y[2][7] | Cr[1][7] | Y[3][7] |
| D6 | Cb[0][6] | Y[0][6] | Cr[0][6] | Y[1][6] | Cb[1][6] | Y[2][6] | Cr[1][6] | Y[3][6] |
| D5 | Cb[0][5] | Y[0][5] | Cr[0][5] | Y[1][5] | Cb[1][5] | Y[2][5] | Cr[1][5] | Y[3][5] |
| D4 | Cb[0][4] | Y[0][4] | Cr[0][4] | Y[1][4] | Cb[1][4] | Y[2][4] | Cr[1][4] | Y[3][4] |
| D3 | Cb[0][3] | Y[0][3] | Cr[0][3] | Y[1][3] | Cb[1][3] | Y[2][3] | Cr[1][3] | Y[3][3] |
| D2 | Cb[0][2] | Y[0][2] | Cr[0][2] | Y[1][2] | Cb[1][2] | Y[2][2] | Cr[1][2] | Y[3][2] |
| D1 | Cb[0][1] | Y[0][1] | Cr[0][1] | Y[1][1] | Cb[1][1] | Y[2][1] | Cr[1][1] | Y[3][1] |
| D0 | Metadata | Y[0][0] | Metadata | Y[1][0] | Metadata | Y[2][0] | Metadata | Y[3][0] |

Annex A

A 1. Dolby Vision Metadata Bitstream Syntax

This section provides information about the Dolby Vision metadata syntax elements for Ultra-HD Blu-ray using the H.265/HEVC system in Ref. [3] as the reference system. The enhanced reference processing unit data syntax as specified in this section conveys the parameters necessary to predict the Dolby Vision signal efficiently from the reconstructed BL video signal, to de-quantize the reconstructed EL video signal, and to form the reconstructed Dolby Vision video signal.

A 1.1 Reference Processing Unit Data Raw Byte Sequence Payload Syntax

TABLE A-1-1

Reference Processing Unit Data Raw Byte Sequence Payload Syntax

|  | Descriptor |
|---|---|
| rpu_data_rbsp( ) {<br>    rpu_data( )<br>    rbsp_trailing_bits( )<br>} |  |

A 1.2 Reference Processing Unit Data Syntax

TABLE A-1-2

Reference Processing Unit Data Syntax

|  | Descriptor |
|---|---|
| rpu_data( ) {<br>    rpu_data_header( )<br>    if( rpu_type == 2 ) {<br>        if( !use_prev_vdr_rpu_flag )<br>            vdr_rpu_data_payload( )<br>        if ( vdr_dm_metadata_present_flag )<br>            vdr_dm_data_payload( )<br>        while( !byte_aligned( ) )<br>            rpu_alignment_zero_bit<br>        rpu_data_crc32<br>    } // EDR RPU data<br>} | <br><br><br><br><br><br><br><br><br>f(1)<br>u(32) |

A 1.3 Reference Processing Unit Data Header Syntax

TABLE A-1-3

Reference Processing Unit Data Header Syntax

|  | Descriptor |
|---|---|
| rpu_data_header( ) { |  |
|   rpu_type | u(6) |
|   rpu_format | u(11) |
|   if ( rpu_type == 2 ) { |  |
|     vdr_rpu_profile | u(4) |
|     vdr_rpu_level | u(4) |
|     vdr_seq_info_present_flag | u(1) |
|     if ( vdr_seq_info_present_flag ) { |  |
|       chroma_resampling_explicit_filter_flag | u(1) |
|       coefficient_data_type | u(2) |
|       if ( coefficient_data_type == 0 ) { |  |
|         coefficient_log2_denom | ue(v) |
|       } |  |
|       vdr_rpu_normalized_idc | u(2) |
|       BL_video_full_range_flag | u(1) |
|       if ( rpu_format & 0x700 == 0 ) { |  |
|         BL_bit_depth_minus8 | ue(v) |
|         EL_bit_depth_minus8 | ue(v) |
|         vdr_bit_depth_minus8 | ue(v) |
|         spatial_resampling_filter_flag | u(1) |
|         reserved_zero_3bits | u(3) |
|         el_spatial_resampling_filter_flag | u(1) |
|         disable_residual_flag | u(1) |
|       } // end of sequence header |  |
|     } // end of EDR RPU sequence header |  |
|     vdr_dm_metadata_present_flag | u(1) |
|     use_prev_vdr_rpu_flag | u(1) |
|     if ( use_prev_vdr_rpu_flag ) { |  |
|       prev_vdr_rpu_id | ue(v) |
|     } |  |
|     else { |  |
|       vdr_rpu_id | ue(v) |
|       mapping_color_space | ue(v) |
|       mapping_chroma_format_idc | ue(v) |

TABLE A-1-3-continued

Reference Processing Unit Data Header Syntax

|  | Descriptor |
|---|---|
|       for( cmp = 0; cmp < 3; cmp++ ) { |  |
|         num_pivots_minus2[ cmp ] | ue(v) |
|         for ( pivot_idx = 0; pivot_idx < num_pivots_minus2[ cmp ] + 2; pivot_idx + + ) |  |
|           pred_pivot_value[ cmp ][ pivot_idx ] | u(v) |
|       } // end of pivot points for BL three components |  |
|       if ( rpu_format & 0x700 == 0 && !disable_residual_flag ) { |  |
|         nlq_method_idc | u(3) |
|         nlq_num_pivots_minus2 = 0 |  |
|       } // end of v1.x architecture EL specific |  |
|       num_x_partitions_minus1 | ue(v) |
|       num_y_partitions_minus1 | ue(v) |
|     } // end of EDR RPU frame header |  |
|   } // end of EDR RPU header |  |
| } |  |

A 1.4 Reference Processing Unit Data Payload Syntax

TABLE A-1-4

Reference Processing Unit Data Payload Syntax

|  | Descriptor |
|---|---|
| vdr_rpu_data_payload( ) {<br>    rpu_data_mapping(0, 0)<br>    rpu_data_nlq(0, 0)<br>} |  |

A 1.5 Reference Processing Unit Data Mapping Parameters Syntax

TABLE A-1-5

Reference Processing Unit Data Mapping Syntax

|  | Descriptor |
|---|---|
| rpu_data_mapping (y, x) { |  |
|   num_cmps = 3 |  |
|   for ( cmp = 0; cmp < num_cmps; cmp++ ) { |  |
|     for ( pivot_idx = 0; pivot_idx < num_pivots_minus2[ cmp ] + 1; pivot_idx+− ) { |  |
|       mapping_idc[ y :[ x ][ cmp ][ pivot_idx : | ue(v) |
|       if ( num_mapping_param_predictors[ y ][ x ][ cmp ][ pivot_idx ] > 0 ) |  |
|         mapping_param_pred_flag[ y ][ x ][ cmp ][ pivot_idx ] | u(1) |
|       else |  |
|         mapping_param_pred_flag[ y ][ x ][ cmp ][ pivot_idx ] = 0 |  |
|       if( mapping_param_pred_flag[ y ][ x ][ cmp ][ pivot_idx ] = = 0 ) |  |
|         rpu_data_mapping_param(y, x, cmp, pivot_idx) |  |
|       else { |  |
|         if( num_mapping_param_predictors[ y ][ x ][ cmp ][ pivot_idx ] > 1 ) |  |
|           diff_pred_part_idx_mapping_minus1[ y ][ x ][ cmp ][ pivot_idx ] | ue(v) |
|       } |  |
|     } // pivot_idx |  |
|   } // cmp |  |
| } |  |

TABLE A-1-6

Reference Processing Unit Data Mapping Parameters Syntax

| | Descriptor |
|---|---|
| rpu_data_mapping_param(y, x, cmp, pivot_idx) { | |
|   if( mapping_idc [ y ][ x ][ cmp ][ pivot_idx ] == MAPPING_POLYNOMIAL ) { | |
|     poly_order_minus1: y ][ x ][ cmp ][ pivot_idx ] | ue(v) |
|     if ( poly_order_minus1[ y ][ x ][ cmp ][ pivot_idx ] == 0 ) | |
|       linear_interp_flag[ y ][ x ][ cmp ][ pivot_idx ] | u(1) |
|     if ( poly_order_minus1[ y ][ x ][ cmp ][ pivot_idx ] == 0 &&  linear_interp_flag[ y ][ x ][ cmp ][ pivot_idx ] ) { | |
|       if( coefficient_data_type == 0 ) | |
|         pred_linear_interp_value_int[ y ][ x ]:[ cmp ][ pivot_idx] | ue(v) |
|       pred_linear_interp_value[ y ][ x ][ cmp :[ pivot_idx] | u(v) |
|       if ( pivot_idx = = num_pivots_minus2[cmp: ) | |
|         if( coefficient_data_type == 0 ) | |
|           pred_linear_interp_value_int[ y ][ x ][ cmp ][ pivot_idx + 1 ] | ue(v) |
|         pred_linear_interp_value[ y ][ x ][ cmp ][ pivot_idx + 1 ] | u(v) |
|     } // Linear interpolation | |
|     else { | |
|       for( i = 0 ; i <= poly_order_minus1[ y ]: x ][ cmp ][ pivot_idx ] + 1; i ++ ) { | |
|         if( coefficient_data_type == 0 ) | |
|           poly_coef_int[ y ][ x ][ cmp ][ pivot_idx ][ i ] | se(v) |
|         poly_coef[ y :[ x ][ cmp ][ pivot_idx :[ i ] | u(v) |
|       } // the i-th order | |
|     } // Non-linear | |
|   } // Polynomial coefficients | |
|   else if( mapping_idc [ y ][ x ][ cmp ][ pivot_idx ] == MAPPING_MMR ) { | |
|     mmr_order_minus1[ y ][ x ][ cmp ][ pivot_idx ] | u(2) |
|     if ( coefficient_data_type = = 0 ) | |
|       mmr_constant_int[ y ][ x ][ cmp ][ pivot_idx ] | se(v) |
|     mmr_constant[ y ]: x ][ cmp ][ pivot_idx ] | u(v) |
|     for( i = 1; i <= mmr_order_minus1 + 1; i +− ) { | |
|       for (j = 0; j < 7; j++) { | |
|         if ( coefficient_data_type = = 0 ) | |
|           mmr_coef_int[ y ][ x ][ cmp ][ pivot_idx ][ i ][ j ] | se(v) |
|         mmr_coef[ y ]: x ][ cmp ][ pivot_idx ]: i ][ j ] | u(v) |
|       } // the j-th coefficients | |
|     } // the i-th order | |
|   } // MMR coefficients | |
| } | |

A 1.6 Reference Processing Unit Data Nonlinear Quantization and Quantization Parameters Syntax

TABLE A-1-7

Reference Processing Unit Data Nonlinear Quantization Syntax

| | Descriptor |
|---|---|
| rpu_data_nlq(y, x) { | |
|   num_cmps = 3 | |
|   for ( pivot_idx = 0; pivot_idx < nlq_num_pivots_minus2 + 1; pivot_idx ++ ) { | |
|     for ( cmp = 0; cmp < num_cmps; cmp ++ ) { | |
|       if ( num_nlq_param_predictors[ y ][ x ][ pivot_idx ][ cmp ] > 0 ) | |
|         nlq_param_pred_flag[ y ][ x ][ pivot_idx ][ cmp ] | u(1) |
|       else | |

TABLE A-1-7-continued

Reference Processing Unit Data Nonlinear Quantization Syntax

| | Descriptor |
|---|---|
|         nlq_param_pred_flag[ y ][ x ][ pivot_idx ][ cmp ] = 0 | |
|       if ( nlq_param_pred_flag[ y ][ x ][ pivot_idx ][ cmp ] == 0 ) | |
|         rpu_data_nlq_param(y, x, pivot_idx, cmp) | |
|       else { | |
|         if ( num_nlq_param_predictors[ y ][ x :[ pivot_idx ][ cmp ] > 1 ) | |
|           diff_pred_part_idx_nlq_minus1[ y ][ x ][ pivot_idx ][ cmp ] | ue(v) |
|       } | |
|     } // cmp | |
|   } // pivot_idx | |
| } | |

TABLE A-1-8

Reference Processing Unit Data Nonlinear Quantization Parameters Syntax

| | Descriptor |
|---|---|
| rpu_data_nlq_param(y, x, pivot_idx, cmp) { | |
|   nlq_offset[ y ][ x ][ pivot_idx ][ cmp ] | u(v) |
|   if ( coefficient_data_type = = 0 ) | |
|     vdr_in_max_int[ y ][ x ][ pivot_idx ][ cmp ] | ue(v) |
|   vdr_in_max[ y ][ x ][ pivot_idx ][ cmp ] | u(v) |
|   if ( nlq_method_idc = = NLQ_LINEAR_DZ ) { | |
|     if ( coefficient_data_type == 0 ) | |
|       linear_deadzone_slope_int[ y ][ x ][ pivot_idx ][ cmp ] | ue(v) |
|     linear_deadzone_slope[ y ][ x ][ pivot_idx ][ cmp ] | u(v) |
|     if ( coefficient_data_type = = 0 ) | |
|       linear_deadzone_threshold_int[ y ][ x ][ pivot_idx ][ cmp ] | ue(v) |
|     linear_deadzone_threshold[ y ][ x ][ pivot_idx ][ cmp ] | u(v) |
|   } // Linear dead zone coefficients | |
| } | |

A 2. Dolby Vision Metadata Semantics

This section specifies semantics associated with the syntax elements in the Dolby Vision consumer coding system. The section does not include specifications of semantics associated with the existing syntax elements in the H.265/HEVC system. Refer to Ref. [3] for information about these elements. When the semantics of a syntax element are specified using a table or a set of tables, the bitstream must not include any values not specified therein.

A 2.1 Reference Processing Unit Data Raw Byte Sequence Payload Semantics

The reference processing unit raw byte sequence payload semantics are detailed in Reference Processing Unit Data Semantics.

A 2.2 Reference Processing Unit Data Semantics rpu_alignment_zero_bit shall be equal to 0.

rpu_data_crc32 is a 32-bit CRC to allow error detection for rpu_data0. A model for generating this 32-bit CRC is defined in Annex A of [10]. The CRC value is calculated on the entire rpu_data( ) excluding rpu_data_crc32, using the following generator polynomial:

$$x^{32}+x^{26}+x^{23}+x^{22}+x^{16}+x^{12}+x^{11}+x^{10}+x^{8}+x^{7}+x^{5}+x^{4}+x^{2}+1$$

A 2.3 Reference Processing Unit Data Header Semantics rpu_type specifies the type of this RPU and must be 2 for the BDA Ultra HD Blu-ray Option-A HDR coding system.

rpu_format specifies further information related to the prediction and coding process given rpu_type. The value of rpu_format must remain the same for the entire sequence. For BDA Ultra-HD Blu-ray, rpu_format must be set to 0.

TABLE A-2-1

Definition of rpu_format field

| Major version rpu_format bit[10:8] | Minor version rpu_format bit[7:4] | Codec Version |
|---|---|---|
| 0b000 | 0b0000 | Dolby Consumer EDR codec v1.0 architecture |
| 0b000 . . . 0b001 | 0b0001 . . . 0b1111 | Reserved for future Use |
| 0b010 . . . 0b111 | 0b0000 . . . 0b1111 | Unspecified | vdr_rpu_profile and vdr_rpu_level specify the profile and the level constraints that the Dolby Vision reference processing conforms to, and must be 1 and 0, respectively, for BDA Option-A HDR.

vdr_seq_info_present_flag indicates if Dolby Vision sequence information is present in the current reference processing unit. When Dolby Vision sequence level information is present, all values of included syntax elements must remain the same for the entire video sequence. For BDA Ultra-HD Blu-ray, vdr_seq_info_present_flag must be set to 0.

chroma_resampling_explicit_filter_flag must be equal to 0 for Ultra-HD Blu-ray.

coefficient_data_type specifies the data types of the mapping parameters and the NLQ parameters used during Dolby Vision codec processing The value of coefficient_data_type must be in the range of 0 to 3.

The allowed parameter data types are as shown in the following table.

TABLE A-2-2

Dolby Vision Codec Coefficient Data Types

| coefficient_data_type | Dolby Vision Decoding Coefficient Data Type |
|---|---|
| 0 | fixed point |
| 1 | 32-bit single precision defined in IEEE-754-2008 |
| 2 . . . 3 | Reserved | coefficient_log2_denom specifies the number of fractional bits for Dolby Vision decoding related coefficients if coefficient_data_type is equal to 0. coefficient_log2_denom must be in the range of 0 to 32.

coefficient_log2_denom is not present when coefficient_data_type is not equal to 0. When coefficient_log2_denom is not present, it is assumed to be 0.

vdr_rpu_normalized_idc specifies what type of normalization is applied to the input and output data of the Dolby Vision reference processing unit interlayer prediction process. For Ultra-HD Blu-ray vdr_rpu_normalized_idc must be 1.

BL_video_full_range_flag equal to 1 specifies the black level and range of the luma and chroma BL signals is in full range. If BL_full_range_flag is equal to 0, the black level and range of the luma and chroma BL signals is in standard range.

When the BL_video_full_range_flag syntax element is not present, the value of

BL_video_full_range_flag is assumed to be equal to 0.

BL_bit_depth_minus8 is used to derive the bit depth of BL signal, BL_bit_depth.

BL_bit_depth is equal to BL_bit_depth_minus8+8. For Ultra-HD Blu-ray

BL_bit_depth_minus8 must be equal to 2.

EL_bit_depth_minus8 is used to derive the bit depth of the EL signal, EL_bit_depth.

EL_bit_depth is equal to EL_bit_depth_minus8+8. For Ultra-HD Blu-ray

EL_bit_depth_minus8 must be equal to 2.

vdr_bit_depth_minus8 is used to derive the bit depth of the reconstructed Dolby Vision signal, vdr_bit_depth. vdr_bit_depth is equal to vdr_bit_depth_minus8+8. The value of vdr_bit_depth_minus8 must be in the range of 0 to 6.

spatial_resampling_filter_flag must be equal to 0 for Ultra-HD Blu-ray.

reserved_zero_3bits must be equal to 0.

el_spatial_resampling_filter_flag equal to 1 specifies that the EL spatial resampling filter is used for EL decoding. If 0, this means spatial resampling is bypassed during EL decoding. The value of el_spatial_resampling_filter_flag must be in the range of 0 and 1. The sum of el_spatial_resampling_filter_flag and spatial_resampling_filter_flag must be less than or equal to 1.

disable_residual_flag must be equal to 0 for Ultra-HD Blu-ray.

vdr_dm_metadata_present_flag specifies whether the vdr_dm_data_payload ( ) syntax structure is present. The following values are supported:

1: vdr_dm_data_payload ( ) syntax structure as defined in Annex A.2 is present

0: vdr_dm_data_payload ( ) syntax structure is not present.

If vdr_dm_metadata_present_flag is not present, it is assumed to be 0. For Ultra-HD Blu-ray vdr_dm_metadata_present_flag must be equal to 1.

use_prev_vdr_rpu_flag specifies whether the current Dolby Vision reference processing unit is predicted from a previously sent reference processing unit. The following values are supported.

1: A previously sent Dolby Vision reference processing unit is used to generate the interlayer prediction for the current picture 0: The current Dolby Vision reference processing unit is transmitted explicitly, and a vdr_rpu_id is assigned to the current Dolby Vision reference processing unit.

When the BL picture is an instantaneous refresh picture, the value of use_prev_vdr_rpu_flag must be 0.

prev_vdr_rpu_id specifies the rpu_id of the previously sent Dolby Vision reference processing unit that is used to process the current picture.

The value of prev_vdr_rpu_id must be in the range of 0 to 15, further constrained by the number of Dolby Vision reference processing units transmitted since the last instantaneous decoding refresh picture. If prev_vdr_rpu_id is not present, it must be set to −1 (invalid rpu_id).

vdr_rpu_id vdr_rpu_id specifies the rpu_id assigned to the current Dolby Vision reference processing unit that is explicitly transmitted in the rpu_data_payload ( ).

The value of vdr_rpu_id must be in the range of 0 to 15. If the BL picture is an instantaneous decoding refresh picture, vdr_rpu_id must be equal to 0.

An instantaneous decoding refresh picture causes the decoding process to mark all reference processing units as unused for reference immediately after the reference processing unit bitstream decoding of the instantaneous decoding refresh picture. All reference processing units that follow a reference processing unit of the instantaneous decoding refresh picture can be decoded without referencing from any reference processing unit that precedes the reference processing unit of the instantaneous decoding refresh picture.

mapping_color_space must be set to 0 for BDA Option-A.

mapping_chroma_format_idc must be set to 0 for BDA Option-A.

num_pivots_minus2 [cmp] specifies the number of pivot points minus two used to perform the piecewise mapping process for the color component cmp. For example, if one mapping model is applied for the entire BL signal dynamic range, then the value of num_pivots_minus2 is equal to 0.

The value of num_pivots_minus2 must be in the range of 0 to 7, inclusive.

pred_pivot_value[cmp][i] is used to derive the value pivot_value[cmp][i] of the i-th pivot point for the component cmp. These pivot points collectively define the boundaries of the piecewise mapping process. The value of pivot_value[cmp][i] is derived using the following pseudocode. The array pred_pivot_value[ ][ ] is used as input and the array pivot_value[ ][ ] is used as output. The value of i must be in the range of 0 to (num_pivots_minus2+1), inclusive.

The number of bits used for the representation of the pred_pivot_value[cmp][i] syntax element is BL_bit_depth bits.

TABLE A-2-3

Interlayer Mapping Methods

| mapping_idc | Name | Method |
|---|---|---|
| 0 | MAPPING_POLYNOMIAL | $N^{th}$ order polynomial mapping (N >= 1) |
| 1 | MAPPING_MMR | Multivariate multiple regression mapping | mapping_param_pred_flag [y][x][cmp][pivot_idx] specifies whether the mapping parameters associated with mapping_idc[y][x][cmp][pivot_idx] are explicitly transmitted or predicted from a previous partition in the current picture reference processing unit. Supported values are:
  0: The mapping parameters associated with mapping_idc [y][x][cmp][pivot_idx] are explicitly transmitted.
  1: The mapping parameters of a previous partition from the current picture are assigned to the mapping parameters associated with mapping_idc[y][x][cmp][pivot_idx].

When the syntax element mapping_param_pred_flag[y][x][cmp][pivot_idx]is not present, it shall be inferred to be 0.

If no predictor is available from previous partitions in the current picture (for example, if no previous partition from the current picture reference processing unit uses the same mapping method as indicated by mapping_idc[y][x][cmp][pivot_idx]), then there will be no predictor available to predict mapping parameters for mapping_idc[y][x][cmp][:

```
assign_pivot_values(pred_pivot_value[ ][ ],num_pivots_minus2 )
{
    int pivot_value[ 3 ][ num_pivots_minus_2+2 ];
    int pivot_idx, cmp;
    for( cmp = 0; cmp < 3; cmp ++ ) {
        pivot_value[ cmp ][ 0 ] = pred_pivot_value[ cmp ][ 0 ];
        for( pivot_idx = 1; pivot_idx < num_pivots_minus2[ cmp ] + 2; pivot_idx ++)
            pivot_value[ cmp ][ pivot_idx ] =
                pivot_value[ cmp ][ pivot_idx - 1 ]+pred_pivot_value[ cmp ][ pivot_idx
];
    }
    return pivot_value;
}
```

The component order is Y, Cb, Cr for cmp=0, 1, 2.

nlq_method_idc specifies the NLQ method used for current EL video frame. The value of nlq_method_idc must be set to 0 for BDA Option-A.

num_x_partitions_minus1 must be set to 0 for BDA Option-A.

num_y_partitions_minus1 must be set to 0 for BDA Option-A.

A 2.4 Reference Processing Unit Data Payload Semantics

This section provides details on the semantics of the reference processing unit data payload for rpu_type equal to 2.

A 2.4.1 Reference Processing Unit Data Mapping Syntax mapping_idc [y ][x ][cmp ][pivot_idx ] specifies the mapping method used for the color component cmp, and the dynamic range identified by pivot_idx.

The value of mapping_idc[y][x][crmp][pivot_idx] must be in the range of 0 to 1, inclusive. The values of mapping_idc[y][x][cmp][pivot_idx] and the corresponding mapping method currently supported in the Dolby Vision system for BDA Option-A are specified in the following table.

pivot_idx]. In this case, num_mapping_param_predictors[y][x][cmp][pivot_idx] and mapping_param_pred_flag [y][x][cmp][pivot_idx] are both set to 0.

Note—num_mapping_param_predictors [y][x][cmp][pivot_idx] is the number of available mapping parameter predictors in the current picture associated with mapping_idc[y][x][cmp][pivot_idx]. This number increments by one when a new set of mapping parameters associated with mapping_idc[y][x][cmp][pivot_idx] is explicitly transmitted, i.e. the value of mapping_param_pred_flag [y][x:cmp][pivot_idx] is 0.

diff_pred_part_idx_mapping_minus1 [y][x][cmp][pivot_idx] specifies a differential value used to derive the partition index, pred_part_idx_mapping [y][x][cmp][pivot_idx], of the mapping parameter predictor in the current reference processing unit. The presence of diff_pred_part_idx_mapping_minus[y][x][cmp][pivot_idx] depends on num_mapping_param_predictors [y][x][cmp][pivot_idx].

The value of pred_part_idx_mapping [y][x][cmp][pivot_idx] is derived and constrained as follows:
  If num_mapping_param_predictors[y][x][cmp] [pivot_idx] is greater than 1, the value of pred_part_idx_ mapping[y][x][cmp][pivot_idx] is set to (curr_part_idx−diff_pred_part_idx_mapping_minus1[y][x][cmp][pivot_idx]−1).

Note—curr_part_idx is the index of current partition in raster scan order.

Otherwise, if num_mapping_param_predictors [y][x][cmp][pivot_idx] is equal to i, the value of pred_part_idx_mapping [y][x][cmp][pivot_idx] is set to be the partition index of the only previous partition in the current reference processing unit that can serve as the predictor of mapping parameters associated with mapping_idc[y]: x][cmp][pivot_idx].

The value of pred_part_idx_mapping [y][x][cmp][pivot_idx] must be in the range of 0 to (curr_part_idx−1).

A 2.4.2 Reference Processing Unit Data Mapping Parameters Semantics poly_order_minus1[y][x][cmp][pivot_idx] specifies the order of the polynomial mapping method identified by mapping_idc[y][x][cmp][pivot_idx]. The value of poly_order_minus1[y][x][cmp][pivot_idx] must be 0 or 1.

linear_interp_flag[y][x][cmp][pivot_idx] specifies whether the first order polynomial mapping parameters are indicated using linear interpolation method.

1: The first-order polynomial mapping parameters are indicated using linear interpolation method.

0: The first-order polynomial mapping parameters are indicated using polynomial coefficients.

Note—linear interpolation is another way to specify the first order polynomial. The inverse mapped value for the end points for each piece is specified and the values in between the end points are interpolated. Linear interpolation can be used to implement look-up tables.

pred_linear_interp_value_int[y][x][cmp][pivot_idx] specifies the integer portion of fp_pred_linear_interp_value[y][x][cmp][pivot_idx] when coefficient_data_type is equal to 0. If coefficient_data_type equal to 1, pred_linear_interp_value_int[y][x][cmp][pivot_idx] is not present.

Note—fp_pred_linear_interp_value[y][x][cmp][pivot_idx] is used to derive the value of linear_interp_value[y][x][cmp][pivot_idx] associated with mapping_idc[y][x][cmp][pivot_idx] when linear_interp_flag [y][x][cmp][pivot_idx] is equal to 1 and coefficient_data_type is equal to 0.

pred_linear_interp_value[y][x][cmp][pivot_idx] specifies the fractional portion of fp_pred_linear_interp_value[y][x][cmp][pivot_idx] when coefficient_data_type is equal to 0. If coefficient_data_type equal to 1, pred_linear_interp_value[y][x][cmp][pivot_idx] is used to derive the value of linear_interp_value[y][x][cmp][pivot_idx] associated with mapping_idc[y][x][cmp][pivot_idx] when linear_interp_flag[y][x][cmp][pivot_idx] is equal to 1. If coefficient_data_type is equal to 0, the length of the pred_linear_interp_value[y][x][cmp][pivot_idx] syntax element is coefficient_log2_denom bits. If coefficient_data_type is equal to 1, the length of the pred_linear_interp_value[y][x][cmp][pivot_idx] syntax element is 32 bits.

The values of linear_interp_value[y][x][cmp][pivot_idx] is derived and constrained as follows:

If pivot_idx is equal to 0, the value of linear_interp_value[y][x][cmp][pivot_idx] is equal to pred_linear_interp_value[y][x][cmp][pivot_idx] if coefficient_data_type is equal to 1. If coefficient_data_type is equal to 0, fp_pred_linear_interp_value[y][x][cmp][pivot_idx]= (pred_linear_interp_value_int[y][x][cmp][pivot_idx] <<coefficient_log2_denom)+pred_linear_interp_value[y][x][cmp][pivot_idx] and linear_interp_value[y][x][cmp][pivot_idx]=fp_pred_linear_interp_value[y][x][cmp][pivot_idx].

Otherwise, the value of linear_interp_value[y][x][cmp][pivot_idx] is equal to pred_linear_interp_value[y][x][cmp][pivot_idx]+linear_interp_value[y][x][cmp][pivot_idx−1] if coefficient_data_type is equal to 1. If coefficient_data_type is equal to 0, fp_pred_linear_interp_value[y][x][cmp][pivot_idx]=(pred_linear_interp_value_int[y][x][cmp][pivot_idx] <<coefficient_log2_denom)+pred_linear_interp_value[y][x][cmp][pivot_idx] and linear_interp_value[y][x][cmp][pivot_idx]=fp_pred_linear_interp_value[y][x][cmp][pivot_idx]+linear_interp_value[y][x][cmp][pivot_idx−1].

If vdr_rpu_normalized_idc is equal to 0, linear_interp_value[y][x][cmp][i] shall be in the range of [0, $(2^{vdr\_bit\_depth}-1)$]. If vdr_rpu_normalized_idc is equal to 1, linear_interp_value[y][x][cmp][i] shall be in the decimal valued range of [0, 1).

poly_coef_int[y][x][cmp][pivot_idx][i] specifies the integer portion of fp_poly_coef[y][x][cmp][pivot_idx][i] when coefficient_data_type is equal to 0. If coefficient_data_type is equal to 1, poly_coef_int[y][x][cmp][pivot_idx][i] is not present.

Note—fp_poly_coef [y][x][cmp][pivot_idx][i] is used to derive the value of the i-th order polynomial coefficient associated with mapping_idc[y][x][cmp][pivot_idx] when coefficient_data_type is equal to 0.

poly_coef[y][x][cmp][pivot_idx][i] specifies the fractional portion of fp_poly_coef[y][x][cmp][pivot_idx][i] when coefficient_data_type is equal to 0. If coefficient_data_type is equal to 1, poly_coef[y][x][cmp][pivot_idx][i] is used to derive the value of the i-th order polynomial coefficient associated with mapping_idc[y][x][cmp][pivot_idx]. If coefficient_data_type is equal to 0, the length of the poly_coef[y][x][cmp][pivot_idx][i] syntax element is coefficient_log2_denom bits. If coefficient_data_type is equal to 1, the length of the poly_coef[y][x][cmp][pivot_idx][i] syntax element is 32 bits.

The value of the i-th order polynomial coefficient associated with mapping_idc[y][x][cmp][pivot_idx] is derived as follows:

If coefficient_data_type is equal to 0, the value of the i-th order polynomial coefficient is equal to fp_poly_coef [y][x][cmp][pivot_idx][i]=(poly_coef_int[y][x][cmp][pivot_idx][i]<<coefficient_log2_denom)+poly_coef[y][x][cmp][pivot_idx][i].

If coefficient_data_type is equal to 1, the value of the i-th order polynomial coefficient is equal to poly_coef[y][x][cmp][pivot_idx][i].

mmr_order_minus1[y][x][cmp][pivot_idx] specifies the order of the multivariate multiple regression mapping method identified by mapping_idc[y][x][cmp][pivot_idx]. The value of mmr_order_minus1[y][x][cmp][pivot_idx] must be in the range of 0 to 2.

mmr_constant_int[y][x][cmp][pivot_idx] specifies the integer portion of fp_mmr_constant[y][x][cmp][pivot_idx] when coefficient_data_type is equal to 0. If coefficient_data_type is equal to 1, mmr_constant_int[y][x][cmp][pivot_idx] is not present.

Note—fp_mmr_constant[y][x][cmp][pivot_idx] is used to derive the value of the multivariate multiple regression constant coefficient associated with mapping_idc[y][x][cmp][pivot_idx] when coefficient_data_type is equal to 0.

mmr_constant[y][x][cmp][pivot_idx] specifies the fractional portion of fp_mmr_constant[y][x][cmp][pivot_idx]

when coefficient_data_type is equal to 0. If coefficient_data_type is equal to 1, mmr_constant[y][x][cmp][pivot_idx] is used to derive the value of multivariate multiple regression constant coefficient associated with mapping_idc[y][x][cmp][pivot_idx]. If coefficient_data_type is equal to 0, the length of the mmr_constant[y][x][cmp][pivot_idx] syntax element is coefficient_log2_denom bits. If coefficient_data_type is equal to 1, the length of the mmr_constant[y][x][cmp][pivot_idx] syntax element is 32 bits.

The value of multivariate multiple regression constant coefficient associated with mapping_idc[y][x][cmp][pivot_idx] is derived as follows:

If coefficient_data_type is equal to 0, the value of multivariate multiple regression constant coefficient is equal to fp_mmr_constant[y][x][cmp][pivot_idx]=(mmr_constant_int[y][x][cmp][pivot_idx]<<coefficient_log2_denom)+mmr_constant[y][x][cmp][pivot_idx].

If coefficient_data_type is equal to 1, the value of multivariate multiple regression constant coefficient is equal to mmr_constant[y][x][cmp][pivot_idx].

mmr_coef_int[y][x][cmp][pivot_idx][i][j] specifies the integer portion of fp_mmr_coef[y][x][cmp][pivot_idx][i][j] when coefficient_data_type is equal to 0. If coefficient_data_type is equal to 1, mmr_coef_int[y][x][cmp][pivot_idx][i][j] is not present.

Note—fp_mmr_coef[y][x][cmp][pivot_idx][i][j] is used to derive the value of the j-th multivariate multiple regression coefficient at the i-th order associated with mapping_idc[y][x][cmp][pivot_idx] when coefficient_data_type is equal to 0.

mmr_coef[y][x][cmp][pivot_idx][i][j] specifies the fractional portion of fp_mmr_coef[y][x][cmp][pivot_idx][i][j] when coefficient_data_type is equal to 0. If coefficient_data_type is equal to 1, mmr_coef[y][x][cmp][pivot_idx][i][j] is used to derive the value of the j-th multivariate multiple regression coefficient at the i-th order associated with mapping_idc[y][x][cmp][pivot_idx]. If coefficient_data_type is equal to 0, the length of the mmr_coef [y][x][cmp][pivot_idx][i][j] syntax element is coefficient_log2_denom bits. If coefficient_data_type is equal to 1, the length of the mmr_coef [y][x][cmp][pivot_idx][i][j] syntax element is 32 bits.

The value of the j-th multivariate multiple regression coefficient at the i-th order associated with mapping_idc[y][x][cmp][pivot_idx] is derived as follows:

If coefficient_data_type is equal to 0, the value of the j-th multivariate multiple regression coefficient at the i-th order is equal to fp_mmr_coef [y][x][cmp][pivot_idx][i][j]=(mmr_coef_int[y][x][cmp][pivot_idx][i][j]<<coefficient_log2_denom)+mmr_coef[y][x][cmp][pivot_idx][i][j].

If coefficient_data_type is equal to 1, the value of the j-th multivariate multiple regression coefficient at the i-th order is equal to mmr_coef [y][x][cmp][pivot_idx][i][j].

A 2.4.3 Reference Processing Unit Data Nonlinear Quantization Semantics nlq_param_pred_flag[y][x][pivot_idx][cmp] specifies whether NLQ parameters associated with the partition, vertical coordinate y, horizontal coordinate x, pivot_idx, and cmp are explicitly transmitted or predicted from a previous partition in the current picture reference processing unit.

The two supported values are:

0: The NLQ parameters associated with vertical coordinate y, horizontal coordinate x, pivot_idx, and cmp are explicitly transmitted.

1: The NLQ parameters of a previous partition in the reference processing unit from the current picture are assigned to the NLQ parameters associated with the partition with vertical coordinate y, horizontal coordinate x, pivot_idx, and cmp.

When the syntax element nlq_param_pred_flag[y][x][pivot_idx][cmp] is not present, it is assumed to be 0.

Occasionally, no predictor from previous partitions in the current reference processing unit is available. For example, if no previous partition reference processing unit from the current picture uses the same NLQ method as indicated by the partition with vertical coordinate y, horizontal coordinate x, pivot_idx, and cmp, there will be no predictor available to predict NLQ parameters for the partition with vertical coordinate y and horizontal coordinate x, pivot_idx, and cmp. In this case, num_nlq_param_predictors[y][x][pivot_idx][cmp] and nlq_param_pred_flag [y][x][pivot_idx][cmp] are both set to 0.

Note—The num_nlq_param_predictors [y][x][pivot_idx][cmp] is the number of available NLQ parameter predictors in the current reference processing unit for the current partition with vertical coordinate y, horizontal coordinate x, pivot_idx, and cmp. This number is incremented by one when a new set of NLQ parameters is explicitly transmitted. (That is, when the value of nlq_param_pred_flag [y][x][pivot_idx][cmp] is 0).

diff_pred_part_idx_nlq_minus1[y][x][pivot_idx][cmp] specifies a differential value used to derive the partition index, pred_part_idx_nlq[y][x][pivot_idx][cmp], of the NLQ parameter predictor from the reference processing unit of the current picture. The presence of the syntax element diff_pred_part_idx_nlq_minus1[y][x][pivot_idx][cmp] depends on the value of num_nlq_param_predictors[y][x][pivot_idx][cmp].

The value of pred_part_idx_nlq[y][x][pivot_idx][cmp] is derived and constrained as follows:

If num_nlq_param_predictors[y][x][pivot_idx][cmp] is greater than 1, the value of pred_part_idx_nlq[y][x][pivot_idx][cmp] is set to (curr_part_idx−diff_pred_part_idx_nlq_minus1[y][x][pivot_idx][cmp]−1).

If num_nlq_param_predictors[y][x][pivot_idx][cmp] is equal to 1, the value of pred_part_idx_nlq[y][x][pivot_idx][cmp] is set to be the partition index of the only previous partition in the reference processing unit of the current picture that can serve as the predictor of NLQ parameters associated with the partition in vertical coordinate y, horizontal coordinate x, pivot_idx, and cmp.

The value of pred_part_idx_nlq[y][x][pivot_idx][cmp] must be in the range of 0 and (curr_part_idx−1).

A 2.4.4 Reference Processing Unit Data Nonlinear Quantization Parameter Semantics nlq_offset[y][x][pivot_idx][cmp] specifies the NLQ offset coefficient associated with the partition in vertical coordinate y, horizontal coordinate x, pivot_idx, and cmp. The number of bits used for the representation of nlq_offset[y][x][pivot_idx][cmp] syntax element is EL_bit_depth. The value of nlq_offset [y][x][pivot_idx][cmp] is in the range of $[0, 2^{EL\_bit\_depth}-1]$.

vdr_in_max_int[y][x][pivot_idx][cmp] specifies the integer portion of fp_vdr_in_max[y][x][pivot_idx][cmp] when coefficient_data_type is equal to 0. If coefficient_data_type is equal to 1, vdr_in_max_int[y][x][pivot_idx][cmp] is not present.

Note—fp_vdr_in_max[ y ] [ x ] [pivot_idx] [ cmp ] is used to derive the value of non-linear quantization maximum EL signal value coefficient associated with the partition with vertical coordinate y and horizontal coordinate x, pivot index pivot_idx and component cmp when coefficient_data_type is equal to 0.

vdr_in_max[y][x][pivot_idx][cmp] specifies the fractional portion of fp_vdr_in_max[y][x][pivot_idx][cmp] when coefficient_data_type is equal to 0.

If coefficient_data_type is equal to 1, vdr_in_max[y][x][pivot_idx][cmp] is used to derive the value of the NLQ maximum EL signal value coefficient associated with the partition in vertical coordinate y, horizontal coordinate x, pivot_idx, and cmp.

If coefficient_data_type is equal to 0, the length of the vdr_in_max[y][x][pivot_idx][cmp] syntax element is coefficient_log2_denom bits.

If coefficient_data_type is equal to 1, the length of the vdr_in_max[y][x][pivot_idx][cmp] syntax element is 32 bits.

The value of the NLQ maximum EL signal value coefficient associated with the partition in vertical coordinate y, horizontal coordinate x, pivot_idx, and cmp is derived as follows:

If coefficient_data_type is equal to 0, the value of the NLQ maximum EL signal value coefficient is equal to fp_vdr_in_max[y][x][pivot_idx][cmp], where, fp_vdr_in_max[y][x][pivot_idx][cmp]=(vdr_in_max_int[y][x][pivot_idx][cmp]
<<coefficient_log2_denom)+vdr_in_max[y][x][pivot_idx][cmp].

If coefficient_data_type is equal to 1, the value of NLQ maximum EL signal value coefficient is equal to vdr_in_max[y][x][pivot_idx][cmp].

linear_deadzone_slope_int[y][x][pivot_idx][cmp] specifies the integer portion of fp_linear_deadzone_slope [y][x][pivot_idx][cmp] when coefficient_data_type is equal to 0. If coefficient_data_type is equal to 1, linear_deadzone_slope_int[y][x][pivot_idx][cmp] is not present.

Note—fp_linear_deadzone_slope [ y ][ x ] [pivot_idx][ cmp ] is used to derive the value of linear dead zone slope coefficient associated with the partition with vertical coordinate y and horizontal coordinate x, pivot index pivot_idx and component cmp when coefficient_data_type is equal to 0.

linear_deadzone_slope[y][x][pivot_idx][cmp] specifies the fractional portion of fp_linear_deadzone_slope[y][x][pivot_idx][cmp] when coefficient_data_type is equal to 0.

If coefficient_data_type is equal to 1, linear_deadzone_slope [y][x][pivot_idx][cmp] is used to derive the value of linear dead zone slope coefficient associated with the partition with vertical coordinate y and horizontal coordinate x, pivot index pivot_idx and component cmp.

If coefficient_data_type is equal to 0, the length of the linear_deadzone_slope [y][x][pivot_idx][cmp] syntax element is coefficient_log2_denom bits.

If coefficient_data_type is equal to 1, the length of the linear_deadzone_slope [y][x][pivot_idx][cmp] syntax element is 32 bits.

The value of linear dead zone slope coefficient associated with the partition with vertical coordinate y and horizontal coordinate x, pivot index pivot_idx and component cmp is derived as follows:

If coefficient_data_type is equal to 0, the value of linear dead zone slope coefficient is equal to fp_linear_deadzone_slope[y][x][pivot_idx][cmp]=(linear_deadzone_slope_int[y][x][pivot_idx][cmp]
<<coefficient_log2_denom)+linear_deadzone_slope [y][x][pivot_idx][cmp].

If coefficient_data_type is equal to 1, the value of linear dead zone slope coefficient is equal to linear_deadzone_slope[y][x][pivot_idx][cmp].

linear_deadzone_threshold_int[y][x][pivot_idx][cmp] specifies the integer portion of fp_linear_deadzone_threshold[y][x][pivot_idx][cmp] when coefficient_data_type is equal to 0. If coefficient_data_type is equal to 1, linear_deadzone_threshold_int[y][x][pivot_idx][cmp] is not present.

Note—fp_linear_deadzone_threshold[ y ] [ x ][pivot_idx][ cmp ] is used to derive the value of linear dead zone threshold coefficient associated with the partition with vertical coordinate y and horizontal coordinate x, pivot index pivot_idx and component cmp when coefficient_data_type is equal to 0.

linear_deadzone_threshold[y][x][pivot_idx][cmp] specifies the fractional portion of fp_linear_deadzone_threshold [y][x][pivot_idx][cmp] when coefficient_data_type is equal to 0.

If coefficient_data_type is equal to 1, linear_deadzone_threshold[y][x][pivot_idx][cmp] is used to derive the value of linear dead zone threshold coefficient associated with the partition with vertical coordinate y and horizontal coordinate x, pivot index pivot_idx and component cmp.

If coefficient_data_type is equal to 0, the length of the linear_deadzone_threshold [y][x][pivot_idx][cmp] syntax element is coefficient_log2_denom bits.

If coefficient_data_type is equal to 1, the length of linear_deadzone_threshold [y][x][pivot_idx][cmp] is 32 bits.

The value of linear dead zone threshold coefficient associated with the partition with vertical coordinate y and horizontal coordinate x, pivot index pivot_idx and component cmp is derived as follows:

If coefficient_data_type is equal to 0, the value of linear dead zone threshold coefficient is equal to fp_linear_deadzone_threshold [y][x][pivot_idx][cmp]=(linear_deadzone_threshold_int[y][x][pivot_idx][cmp]
<<coefficient_log2_denom)+
linear_deadzone_threshold[y][x][pivot_idx][cmp].

If coefficient_data_type is equal to 1, the value of linear dead zone threshold coefficient is equal to linear_deadzone_threshold [y][x][pivot_idx][cmp].

Note—The value of linear dead zone threshold coefficient shall be greater than or equal to zero. The value of linear dead zone maximum Dolby Vision EL signal value coefficient shall be greater than or equal to the value of linear dead zone threshold coefficient.

A 3. Dolby Vision Display Management Metadata Bitstream Syntax

This section specifies the syntax and semantics of the Dolby Vision display management metadata bitstream. Dolby Vision display management metadata is not required for reconstructing Dolby Vision signals by the decoding process. Conforming decoders are not required to process this information. When present in the bitstream, Dolby Vision display management metadata must follow the syntax and semantics specified in A 3.1 and A 4. When the Dolby Vision display management metadata is conveyed for the application by some means other than presence within the bitstream, the representation of the Dolby Vision display management metadata is not required to use the same syntax specified in this section.

A 3.1 Dolby Vision Display Management Metadata Bistream Syntax

TABLE A-3-1

| Dolby Vision Display Management Metadata Bistream Syntax | Descriptor |
|---|---|
| Vdr_dm_data_payload( ) { | |
|     affected_dm_metadata_id | ue(v) |
|     current_dm_metadata_id | ue(v) |
|     scene_refresh_flag | ue(v) |
|     YCCtoRGB_coef0 | i(16) |
|     YCCtoRGB_coef1 | i(16) |
|     YCCtoRGB_coef2 | i(16) |
|     YCCtoRGB_coef3 | i(16) |
|     YCCtoRGB_coef4 | i(16) |
|     YCCtoRGB_coef5 | i(16) |
|     YCCtoRGB_coef6 | i(16) |
|     YCCtoRGB_coef7 | i(16) |
|     YCCtoRGB_coef8 | i(16) |
|     YCCtoRGB_offset0 | u(32) |
|     YCCtoRGB_offset1 | u(32) |
|     YCCtoRGB_offset2 | u(32) |
|     RGBtoLMS_coef0 | i(16) |
|     RGBtoLMS_coef1 | i(16) |
|     RGBtoLMS_coef2 | i(16) |
|     RGBtoLMS_coef3 | i(16) |
|     RGBtoLMS_coef4 | i(16) |
|     RGBtoLMS_coef5 | i(16) |
|     RGBtoLMS_coef6 | i(16) |
|     RGBtoLMS_coef7 | i(16) |
|     RGBtoLMS_coef8 | i(16) |
|     signal_eotf | u(16) |
|     signal_eotf_param0 | u(16) |
|     signal_eotf_param1 | u(16) |
|     signal_eotf_param2 | u(32) |
|     signal_bit_depth | u(5) |
|     signal_color_space | u(2) |
|     signal_chroma_format | u(2) |
|     signal_full_range_flag | u(2) |
|     source_min_PQ | u(12) |
|     source_max_PQ | u(12) |
|     source_diagonal | u(10) |
|     num_ext_blocks | ue(v) |
|     if( num_ext_blocks ) { | |
|         while( !byte_aligned( ) ) | |
|             dm_alignment_zero_bit | f(1) |
|         for( i = 0; i < num_ext_blocks; i ++ ) { | |
|             ext_metadata_block( ) | |
|         } | |
|     } | |
| } | |

A 3.2 Dolby Vision Display Management Extended Metadata Bistream Syntax

TABLE A-3-2

| Dolby Vision Display Management Extended Metadata Bistream Syntax | Descriptor |
|---|---|
| Ext_metadata_block( ) { | |
|     ext_block_length | ue(v) |
|     ext_block_level | u(8) |
|     ext_block_payload( ext_block_length, ext_block_level ) | |
| } | |

A 3.3 Dolby Vision Display Management Extended Metadata Payload Bistream Syntax

TABLE A-3-3

| Dolby Vision Display Management Extended Metadata Payload Bistream Syntax | Descriptor |
|---|---|
| ext_block_payload(ext_block_length, ext_block_level) { | |
|     ext_block_len_bits = 8 * ext_block_length | |
|     ext_block_use_bits = 0 | |
|     if( ext_block_level == 1 ) { | |
|         min_PQ | u(12) |
|         max_PQ | u(12) |
|         avg_PQ | u(12) |
|         ext_block_use_bits += 36 | |
|     } | |
|     if( ext_block_level == 2 ) { | |
|         target_max_PQ | u(12) |
|         trim_slope | u(12) |
|         trim_offset | u(12) |
|         trim_power | u(12) |
|         trim_chroma_weight | u(12) |
|         trim_saturation_gain | u(12) |
|         ms_weight | i(13) |
|         ext_block_use_bits += 85 | |
|     } | |
|     while( ext_block_use_bits++ < ext_block_len_bits ) | |
|         ext_dm_alignment_zero_bit | f(1) |
| } | |

A 4. Dolby Vision Display Management Metadata Semantics

A 4.1 Dolby Vision Display Management Metadata Bistream Semantics affected_dm_metadata_id indicates the id number of the Dolby Vision video frame that is relevant for this dm metadata. The value shall be in the range of 0 and 15, inclusive. If affected_dm_metadatadata_id is not present, it shall be inferred to be 0.

current_dm_metadata_id indicates the id number of the current Dolby Vision video frame. The value shall be in the range of 0 and 15, inclusive. If current_dm_metadata_id is not present, it shall be inferred to be 0.

Note: If DM metadata is relevant for the current Dolby Vision video frame, affected_dm_metadata_id shall be set to current_dm_metadata_id. If DM metadata regards upcoming Dolby Vision video frame, affected_dm_metadata_id shall be set to (current_dm_metadata_id+1) (mod 16). affected_dm_metadata_id shall be set to either current_dm_metadata_id or (current_dm_metadata_id+1) (mod 16), therefore, only current and upcoming Dolby Vision video frame's metadata may be described.

scene_refresh_flag equal to 1 specifies the video frame, which DM metadata affects, is a scene refresh point. Please refer to the DM design document for the definition of scene refresh point. The value shall be in the range of 0 and 1, inclusive. If scene_refresh_flag is not present, it shall be inferred to be 0.

YCCtoRGB_coef0 specifies the first coefficient of YCCtoRGB transform matrix. The value shall be in the range of −32768 to 32767, inclusive. If YCCtoRGB_coef0 is not present, it shall be inferred to be 8192.

YCCtoRGB_coef1 specifies the second coefficient of YCCtoRGB transform matrix. The value shall be in the range of −32768 to 32767, inclusive. If YCCtoRGB_coef1 is not present, it shall be inferred to be 0.

YCCtoRGB_coef2 specifies the third coefficient of YCCtoRGB transform matrix. The value shall be in the range of −32768 to 32767, inclusive. If YCCtoRGB_coef2 is not present, it shall be inferred to be 12900.

YCCtoRGB_coef3 specifies the fourth coefficient of YCCtoRGB transform matrix. The value shall be in the range of −32768 to 32767, inclusive. If YCCtoRGB_coef3 is not present, it shall be inferred to be 8192.

YCCtoRGB_coef4 specifies the fifth coefficient of YCCtoRGB transform matrix. The value shall be in the range of −32768 to 32767, inclusive. If YCCtoRGB_coef4 is not present, it shall be inferred to be −1534.

YCCtoRGB_coef5 specifies the sixth coefficient of YCCtoRGB transform matrix. The value shall be in the range of −32768 to 32767, inclusive. If YCCtoRGB_coef5 is not present, it shall be inferred to be −3836.

YCCtoRGB_coef6 specifies the seventh coefficient of YCCtoRGB transform matrix. The value shall be in the range of −32768 to 32767, inclusive. If YCCtoRGB_coef6 is not present, it shall be inferred to be 8192.

YCCtoRGB_coef7 specifies the eighth coefficient of YCCtoRGB transform matrix. The value shall be in the range of −32768 to 32767, inclusive. If YCCtoRGB_coef7 is not present, it shall be inferred to be 15201.

YCCtoRGB_coef8 specifies the ninth coefficient of YCCtoRGB transform matrix. The value shall be in the range of −32768 to 32767, inclusive. If YCCtoRGB_coef8 is not present, it shall be inferred to be 0.

YCCtoRGB_offset0 specifies the first offset of YCCtoRGB transform matrix. The value shall be in the range of 0 to 4294967295, inclusive. If YCCtoRGB_offset0 is not present, it shall be inferred to be 0.

YCCtoRGB_offset1 specifies the second offset of YCCtoRGB transform matrix. The value shall be in the range of 0 to 4294967295, inclusive. If YCCtoRGB_offset1 is not present, it shall be inferred to be 536870912.

YCCtoRGB_offset2 specifies the third offset of YCCtoRGB transform matrix. The value shall be in the range of 0 to 4294967295, inclusive. If YCCtoRGB_offset2 is not present, it shall be inferred to be 536870912.

RGBtoLMS_coef0 specifies the first coefficient of RGBtoLMS transform matrix. The value shall be in the range of −32768 to 32767, inclusive. If RGBtoLMS_coef0 is not present, it shall be inferred to be 5845.

RGBtoLMS_coef1 specifies the second coefficient of RGBtoLMS transform matrix. The value shall be in the range of −32768 to 32767, inclusive. If RGBtoLMS_coef1 is not present, it shall be inferred to be 9702.

RGBtoLMS_coef2 specifies the third coefficient of RGBtoLMS transform matrix. The value shall be in the range of −32768 to 32767, inclusive. If RGBtoLMS_coef2 is not present, it shall be inferred to be 837.

RGBtoLMS_coef3 specifies the fourth coefficient of RGBtoLMS transform matrix. The value shall be in the range of −32768 to 32767, inclusive. If RGBtoLMS_coef3 is not present, it shall be inferred to be 2568.

RGBtoLMS_coef4 specifies the fifth coefficient of RGBtoLMS transform matrix. The value shall be in the range of −32768 to 32767, inclusive. If RGBtoLMS_coef4 is not present, it shall be inferred to be 12256.

RGBtoLMS_coef5 specifies the sixth coefficient of RGBtoLMS transform matrix. The value shall be in the range of −32768 to 32767, inclusive. If RGBtoLMS_coef5 is not present, it shall be inferred to be 1561.

RGBtoLMS_coef6 specifies the seventh coefficient of RGBtoLMS transform matrix. The value shall be in the range of −32768 to 32767, inclusive. If RGBtoLMS_coef6 is not present, it shall be inferred to be 0.

RGBtoLMS_coef7 specifies the eighth coefficient of RGBtoLMS transform matrix. The value shall be in the range of −32768 to 32767, inclusive. If RGBtoLMS_coef7 is not present, it shall be inferred to be 679.

RGBtoLMS_coef8 specifies the ninth coefficient of RGBtoLMS transform matrix. The value shall be in the range of −32768 to 32767, inclusive. If RGBtoLMS_coef8 is not present, it shall be inferred to be 15705.

signal_eotf shall be set to 65535 for Ultra-HD Blu-ray.
signal_eotf_param0 shall be set to 0 for Ultra-HD Blu-ray.
signal_eotf_param1 shall be set to 0 for Ultra-HD Blu-ray.
signal_eotf_param2 shall be set to 0 for Ultra-HD Blu-ray.

signal_bit_depth indicates the bit depth of Dolby Vision signal. The value shall be in the range of 8 to 16, inclusive. If signal_bit_depth is not present, it shall be inferred to be 14.

signal_color_space specifies the Dolby Vision signal color space. The value shall be in the range of 0 to 3, inclusive. If signal_color_space is not present, it shall be inferred to be 0. The corresponding color spaces are defined in the following table:

TABLE A-4-1

Definition of Dolby Vision signal color space Dolby

| signal_color_space | Color Space Representation |
| --- | --- |
| 0 | YCbCr |
| 1 | RGB |
| 2 | IPT |
| 3 | Reserved | signal_chroma_format specifies the Dolby Vision signal chroma format if signal_color_space is equal to 0. The value shall be in the range of 0 to 2, inclusive. If signal_color_space is larger than 0, signal_chroma_format shall be set to 2. If signal_chroma_format is not present, it shall be inferred to be 0. The corresponding chroma formats are specified in the following table:

TABLE A-4-2

Definition of Dolby Vision signal chroma format

| signal_chroma_format | Chroma Format Representation |
| --- | --- |
| 0 | 4:2:0 |
| 1 | 4:2:2 |
| 2 | 4:4:4 | signal_full_range_flag specifies the Dolby Vision signal range. The value shall be in the range of 0 to 3, inclusive. If signal_eotf is equal to 65535, signal_full_range_flag shall be set to 1. If signal_full_range_flag is not present, it shall be inferred to be 1. Refer to [6] for the signal range naming conventions. The corresponding signal ranges are specified in the following table:

TABLE A-4-3

Definition of Dolby Vision signal full range flag

| signal_full_range_flag | signal range |
| --- | --- |
| 0 | Narrow range |
| 1 | Full range |
| 2 | SDI range |
| 3 | Reserved | source_min_PQ specifies the minimum luminance value of source display in 12-bit PQ encoding. The value shall be in the range of 0 to 4095, inclusive. If source_min_PQ is not present, it shall be inferred to be 62.

Note: the 12-bit PQ encoded luminance value is calculated as follows:

$$L = C/10,000$$

$$N = \left(\frac{c_1 + c_2 L^{m_1}}{1 + c_3 L^{m_1}}\right)^{m_2}$$

$$PQ = \text{Floor}((2^b - 1) \times N + 0.5),$$

where
C denotes an optical value in cd/m²
L denotes the corresponding normalized linear value
N denotes the corresponding nonlinear value
$m_1$ is the number $2610/4096 \times \frac{1}{4} = 0.1593017578125$
$m_2$ is the number $2523/4096 \times 128 = 78.84375$
$c_1$ is the number $3424/4096 = 0.8359375 = c_3 - c_2 + 1$
$c_2$ is the number $2413/4096 \times 32 = 18.8515625$
$c_3$ is the number $2392/4096 \times 32 = 18.6875$
b is the number 12

The unary function Floor yields the largest integer not greater than its argument.

PQ is the resulting digital representation source_max_PQ specifies the maximum luminance value of source display in 12-bit PQ encoding. The value shall be in the range of 0 to 4095, inclusive. If source_max_PQ is not present, it shall be inferred to be 3696.

source_diagonal indicates the diagonal size of source display in inch. The value shall be in the range of 0 to 1023, inclusive. If source_diagonal is not present, it shall be inferred to be 42.

num_ext_blocks specifies the number of extended metadata blocks. The value shall be in the range of 0 to 254, inclusive. If num_ext_blocks is not present, it shall be inferred to be 0.

dm_alignment_zero_bit shall be equal to 0. dm_alignment_zero_bit is not present if num_ext_blocks is equal to 0.

A 4.2 Dolby Vision Display Management Extended Metadata Bistream Semantics ext_block_length is used to derive the size of current extended metadata block payload in bytes. The value shall be in the range of 0 to 4294967295, inclusive. ext_block_length is not present if num_ext_blocks is equal to 0. If ext_block_length is not present, it shall be inferred to be 0.

ext_block_level specifies the level of payload contained in the current extended metadata block. The value shall be in the range of 0 to 255, inclusive. The corresponding block levels are defined in the following table. If ext_block_level is not present, it shall be inferred to be 0.

TABLE A-4-4

Definition of extended metadata block type

| ext_block_level | extended metadata block type |
|---|---|
| 0 | Reserved |
| 1 | Level 1 Metadata - Content Range |
| 2 | Level 2 Metadata - Trim Pass |
| 3 ... 255 | Reserved |

Note: If there is more than one extension block with ext_block_level equal to 1, the decoder shall only use the latest level 1 extension block transmitted in the current frame. If there are more than 16 extension blocks with ext_block_level equal to 2, the decoder shall only use the first 16 level 2 extension blocks transmitted in current frame. If there is an extension block with ext_block_level equal to reserved values, the decoder shall ignore that extension block. If there is none of extension block transmistted in current frame, the decoder shall fall back to the values of level 1 and level 2 extended metadata as specified in A 4.3.

A 4.3 Dolby Vision Display Management Extended Metadata Payload Semantics min_PQ specifies the minimum luminance value of current scene in 12-bit PQ encoding. The value shall be in the range of 0 to 4095, inclusive. If min_PQ is not present, it shall be inferred to be equal to the value of source_min_PQ.

max_PQ specifies the maximum luminance value of current scene in 12-bit PQ encoding. The value shall be in the range of 0 to 4095, inclusive. If max_PQ is not present, it shall be inferred to be equal to the value of source_max_PQ.

avg_PQ specifies the midpoint luminance value of current scene in 12-bit PQ encoding. The value shall be in the range of 0 to 4095, inclusive. If avg_PQ is not present, it shall be inferred to be equal to the value of (source_min_PQ+source_max_PQ)/2.

target_max_PQ specifies the maximum luminance value of a target display in 12-bit PQ encoding. The value shall be in the range of 0 to 4095, inclusive. If target_max_PQ is not present, it shall be inferred to be equal to the value of source_max_PQ.

Note: There are more than one extension block with ext_block_level equal to 2, those blocks shall have no duplicated target_max_PQ.

trim_slope specifies the slope metadata. The value shall be in the range of 0 to 4095, inclusive. If trim_slope is not present, it shall be inferred to be 2048. Note that the 12-bit slope value is calculated as follows:

$$\text{trim\_slope} = (S + 0.5) \times 4096$$

trim_offset specifies the offset metadata. The value shall be in the range of 0 to 4095, inclusive. If trim_offset is not present, it shall be inferred to be 2048. Note that the 12-bit offset value is calculated as follows:

$$\text{trim\_offset} = (O + 0.5) \times 4096$$

trim_power specifies the power metadata. The value shall be in the range of 0 to 4095, inclusive. If trim_power is not present, it shall be inferred to be 2048. Note that the 12-bit power value is calculated as follows:

$$\text{trim\_power} = (P + 0.5) \times 4096$$

trim_chroma_weight specifies the chroma weight metadata. The value shall be in the range of 0 to 4095, inclusive. If trim_chroma_weight is not present, it shall be inferred to be 2048. Note that the 12-bit chroma weight value is calculated as follows:

$$\text{trim\_chroma\_weight} = (CW + 0.5) \times 4096$$

trim_saturation_gain specifies the saturation gain metadata. The value shall be in the range of 0 to 4095, inclusive. If trim_saturatioin_gain is not present, it shall be inferred to be 2048. Note that the 12-bit saturation gain value is calculated as follows:

$$\text{trim\_saturation\_gain} = (SG + 0.5) \times 4096$$

ms_weight specifies the multiscale weight metadata. The value shall be in the range of −1 to 4095, inclusive. If ms_weight is not present, it shall be inferred to be 2048. Note that the 12-bit multiscale weight value is calculated as follows:

$$ms\_weight=(MS+1.0)\times 2048$$

Note: If ms_weight is equal to −1, it means the multiscale weight value shall be overridden by the local settings.
ext_dm_alignment_zero_bit shall be equal to 0.

REFERENCES

The following literature supplements the information in this document and each one is incorporated by reference in its entirety for all purposes:

[1] ITU-R Recommendation BT.709, Parameter Values for the HDTV Standards for Production and International Program Exchange, available from http://www.itq.int
[2] ITU-R Recommendation BT.2020, Parameter Values for Ultra-High-Definition Television Systems for Production and International Program Exchange, available from http://www.itu.int
[3] ITU-T H.265 (October 2014), High-Efficiency Video Coding, available at http://www.itu.int
[4] High-Definition Multimedia Interface™ Specification, version 1.4b, available from http://www.hdni.org
[5] High-Definition Multimedia Interface™ Specification, version 2.0, available from http://www.hdmi.org
[6] SMPTE ST 2084:2014, High Dynamic Range Electro-Optical Transfer Function of Mastering Reference Displays, Aug. 16, 2014
[7] SMPTE ST 2086:2014, Mastering Display Color Volume Metadata Supporting High Luminance and Wide Color Gamut Images, Oct. 13, 2014
[8] CEA-861-F, A DTV Profile for Uncompressed High Speed Digital Interfaces.
[9] Audio Visual Application Format Specifications for BD-ROM Version 3.0, White paper Blu-Ray Disc Read-only Format (Ultra HD Blu-ray), Blu-Ray Disc Association, July 2015
[10] ISO/IEC 13818-1:2013, *Information Technology—Generic Coding of Moving Pictures and Associated Audio Information*: Systems, available from www.iso.org.
[11] U.S. patent application Ser. No. 14/364,979, filed on Jun. 12, 1014, "Specifying Visual Dynamic Range Coding Operations and Parameters," by S. Qu et al., published as U.S. Patent Application Pub. No. 2014/0341305.
[12] A. Ballestad and A. Kostin, "Method and Apparatus for Image Data Transformation," U.S. Pat. No. 8,593,480.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to layered representation and decoding of images with enhanced dynamic range, such as those described herein. The computer and/or IC may compute any of a variety of parameters or values that relate to layered representation and decoding of images with enhanced dynamic range described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to layered representation and decoding of images with enhanced dynamic range as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to the efficient layered representation and decoding of images with enhanced dynamic range are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A decoder for generating high-dynamic range video data, wherein the decoder comprises one or more processors and non-transitory memory, wherein generating an output image with the decoder comprises:
   receiving reference processing data and storing at least a portion of the reference processing data in the non-transitory memory;
   parsing a cyclic redundancy check (CRC) parameter from the reference processing data;
   extracting from the reference processing data at least an RPU data header, RPU data payload data, and an RPU-alignment-zero-bit flag;

computing by the decoder a CRC value on the entire reference processing data excluding the CRC parameter;

comparing the CRC value with the CRC parameter to detect an error;

extracting an RPU type flag from the RPU data header; and parsing additional data from the reference processing data only if the value of the RPU type flag matches a predetermined value.

2. The decoder of claim 1, wherein generating an output image with the decoder further comprises extracting from the reference processing data display management payload data.

3. The decoder of claim 1, wherein generating an output image with the decoder further comprises:

receiving a base-layer image;

receiving an enhancement layer image;

and combining the base-layer image and the enhancement layer image based on the reference processing data to generate the output image.

4. The decoder of claim 1, wherein the RPU data payload data comprise RPU prediction mapping data and RPU non-linear-quantizer (NLQ) data.

5. The decoder of claim 1, wherein the RPU type flag comprises the rpu_type flag which specifies a type of RPU processing, and the predetermined value is equal to 2.

6. The decoder of claim 1, wherein generating an output image with the decoder further comprises:

extracting a use-previous-rpu-data flag from the RPU data header and extracting the RPU data payload data only if the use-previous-rpu-data flag is set to zero.

7. The decoder of claim 6, wherein the use-previous-rpu-data flag comprises an use_prev_vdr_rpu_flag flag which, when set to 1 specifies that the current RPU data is predicted from previously received RPU data and when set to 0 specifies that the current RPU data are explicitly received and instructs the decoder to generate a new RPU data ID.

8. The decoder of claim 2, wherein display management payload data are parsed only if a display-management-data-present-flag flag extracted from the RPU data header is set to one.

9. The decoder of claim 8, wherein the display-management-data -present-flag comprises an vdr_dma_metadata_present_flag flag, which when set to 0 specifies that no display management payload data is present, and when set to 1 specifies that display management payload data is present according to a vdr_dm_data_payload( )syntax structure.

10. The decoder of claim 1, wherein the RPU-alignment-zero-bit flag comprises an rpu_alignment_zero_bit flag=0.

11. The decoder of claim 4, wheren the RPU prediction mapping data are extracted according to an rpu_data_mapping( )syntax structure and the RPU non-linear-quantizer (NLQ) data are extracted according to an rpu_data_nlq( )syntax structure.

12. A method for generating high-dynamic range video data with a decoder, wherein the method comprises:

receiving reference processing data using the decoder;

parsing a cyclic redundancy check (CRC) parameter from the reference processing data;

extracting from the reference processing data at least an RPU data header, RPU data payload data, and an RPU-alignment-zero-bit flag;

computing by the decoder a CRC value on the entire reference processing data excluding the CRC parameter;

comparing the CRC value with the CRC parameter to detect an error;

extracting an RPU type flag from the RPU data header; and parsing additional data from the reference processing data only if the value of the RPU type flag matches a predetermined value.

13. The method of claim 12, wherein generating an output image with the decoder further comprises parsing from the reference processing data display management payload data.

14. The method of claim 12, wherein generating an output image with the decoder further comprises:

receiving a base-layer image;

receiving an enhancement layer image;

and combining the base-layer image and the enhancement layer image based on the reference processing data to generate the output image.

15. The method of claim 12, wherein the RPU data payload data comprise RPU prediction mapping data and RPU non-linear-quantizer (NLQ) data.

16. The method of claim 12, wherein the RPU type flag comprises the rpu_type flag which specifies a type of RPU processing, and the predetermined value is equal to 2.

17. The method of claim 12, wherein generating an output image with the decoder further comprises:

extracting a use-previous-rpu-data flag from the RPU data header and extracting the RPU data payload data only if the use-previous-rpu-data flag is set to zero.

18. A non-transitory computer-readable storage medium having stored thereon computer-executable instruction for executing a method with one or more processors in accordance with claim 1.

* * * * *